(12) United States Patent
Lee et al.

(10) Patent No.: US 11,349,612 B2
(45) Date of Patent: May 31, 2022

(54) HYBRID AUTOMATIC REPEAT REQUEST TECHNIQUES IN A WIRELESS LOCAL AREA NETWORK

(71) Applicant: NEWRACOM, Inc., Lake Forest, CA (US)

(72) Inventors: Joonsoo Lee, Seoul (KR); Yong Jin Kwon, Seoul (KR); Hyun Sik Jung, Seoul (KR); Junyoun Won, Seoul (KR); Hyungu Park, Seoul (KR)

(73) Assignee: NEWRACOM, Inc., Lake Forest, CA (US)

( * ) Notice: Subject to any disclaimer, the term of this patent is extended or adjusted under 35 U.S.C. 154(b) by 0 days.

(21) Appl. No.: 17/033,365

(22) Filed: Sep. 25, 2020

(65) Prior Publication Data

US 2021/0099256 A1 Apr. 1, 2021

Related U.S. Application Data

(60) Provisional application No. 62/906,643, filed on Sep. 26, 2019, provisional application No. 62/906,662, filed on Sep. 26, 2019.

(51) Int. Cl.
*H04L 1/00* (2006.01)
*H04L 1/18* (2006.01)
(Continued)

(52) U.S. Cl.
CPC .......... *H04L 1/1816* (2013.01); *H04L 1/0008* (2013.01); *H04L 1/1614* (2013.01); *H04W 80/02* (2013.01); *H04W 84/12* (2013.01)

(58) Field of Classification Search
CPC ... H04L 1/1816; H04L 1/0008; H04L 1/1614; H04L 1/1621; H04L 5/0055; H04W 84/12; H04W 80/02
See application file for complete search history.

(56) References Cited

U.S. PATENT DOCUMENTS

2016/0173178 A1\* 6/2016 Blankenship ........ H04B 7/0632
375/295
2021/0007006 A1\* 1/2021 Chen ..................... H04L 1/1812

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Jamal Javaid
(74) *Attorney, Agent, or Firm* — Nicholson, De Vos, Webster & Elliott, LLP

(57) ABSTRACT

A method performed by a first wireless station is described. The method includes determining, by a Media Access Control (MAC) layer of the first wireless station, a plurality of MAC Protocol Data Units (MPDUs) to transmit to a second wireless station in an aggregated MPDU, wherein a physical layer of the first station is to use a plurality of codewords to represent the plurality of MPDUs, wherein a first MPDU in the plurality of MPDUs is to be represented by a first set of codewords and a second MPDU is to be represented by a second set of codewords from the plurality of codewords; appending padding to the first MPDU such that the first set of codewords does not share a codeword with the second set of codewords; and transmitting the first set of codewords and the second set of codewords to the second wireless station.

18 Claims, 39 Drawing Sheets

(51) Int. Cl.
*H04L 1/16* (2006.01)
*H04W 80/02* (2009.01)
*H04W 84/12* (2009.01)

(56) References Cited

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

\* cited by examiner

| MAXIMUM PHY RATE | PHY RATE ENHANCEMENT | BANDWIDTH/NUMBER OF SPATIAL STREAMS | OPERATING BANDS | |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG}$ * 4 μs | 3.2 μs | 0.8 μs | 312.5 kHz |
| EHT-SIG FIELD 722 | EHT SIGNAL FIELD | $N_{EHTSIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

| | | | | |
|---|---|---|---|---|
| IEEE 802.11A/G | L-STF | L-LTF | L-SIG | DATA |

| | | | | | | | |
|---|---|---|---|---|---|---|---|
| IEEE 802.11N MIXED | L-STF | L-LTF | L-SIG | HT-SIG1 | HT-SIG2 | HT-STF | HT-LTF | DATA |

| IEEE 802.11AC | L-STF | L-LTF | L-SIG | VHT-SIGA1 | VHT-SIGA2 | VHT-STF | VHT-LTF | VHT-SIGB | DATA |

| IEEE 802.11AX SINGLE USER | L-STF | L-LTF | L-SIG | RL-SIG | HE-SIGA1 | HE-SIGA2 | HE-STF | HE-LTF | DATA |

FIG. 31

HYBRID AUTOMATIC REPEAT REQUEST TECHNIQUES IN A WIRELESS LOCAL AREA NETWORK

CROSS-REFERENCE TO RELATED APPLICATION

This application claims the benefit of U.S. Provisional Patent Application No. 62/906,643, filed Sep. 26, 2019 and U.S. Provisional Patent Application No. 62/906,662, filed Sep. 26, 2019, which are incorporated by reference herein in their entirety.

TECHNICAL FIELD

The present disclosure generally relates to wireless communications, and more specifically, relates to Hybrid Automatic Repeat Requests (HARQs) in a wireless local area network.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 31 shows Physical Layer (PHY) Protocol Data Unit (PPDU) formats for various network system, in accordance with some embodiments of the present disclosure.

DETAILED DESCRIPTION

Figure 1:
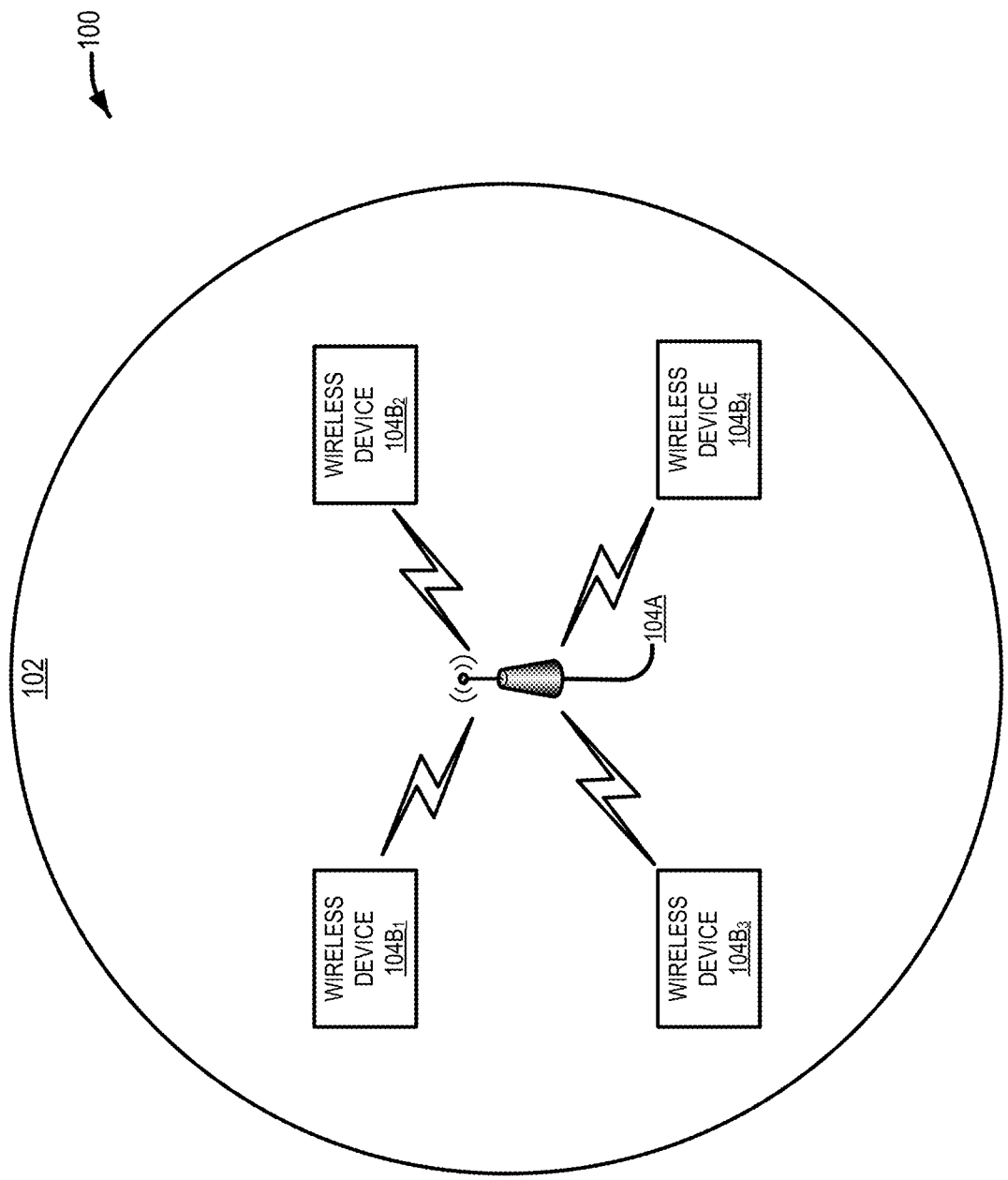
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to Hybrid Automatic Repeat Requests (HARQs) in a wireless local area network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
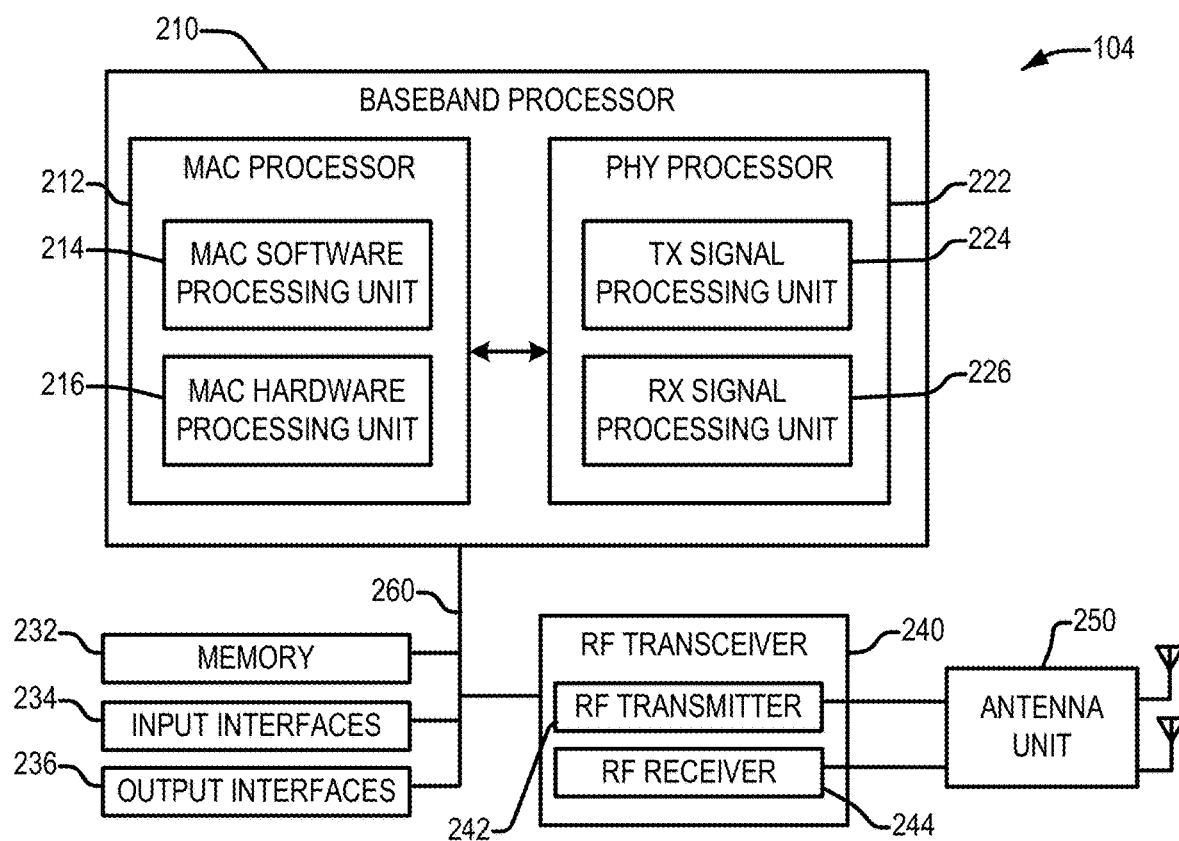
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
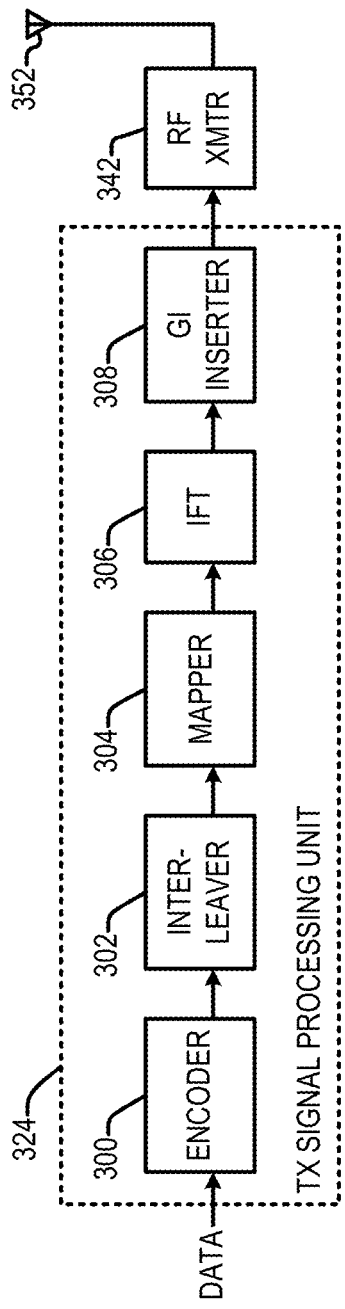
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
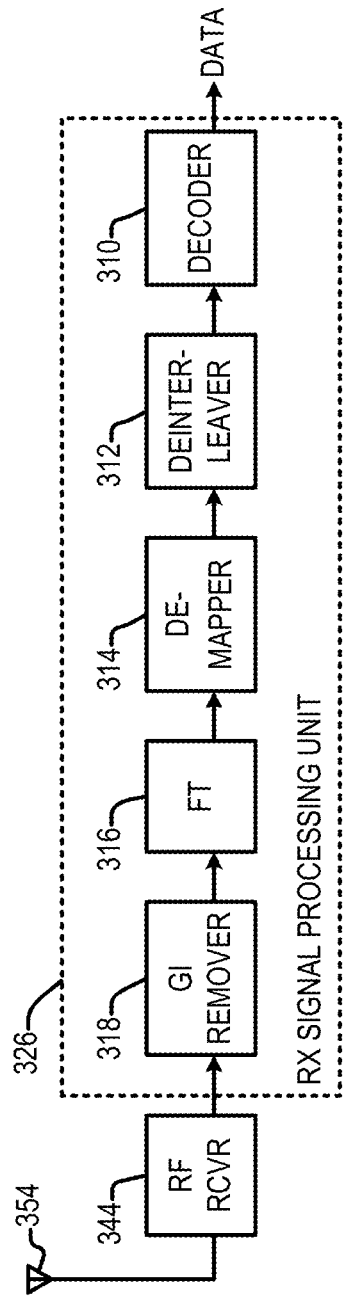
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
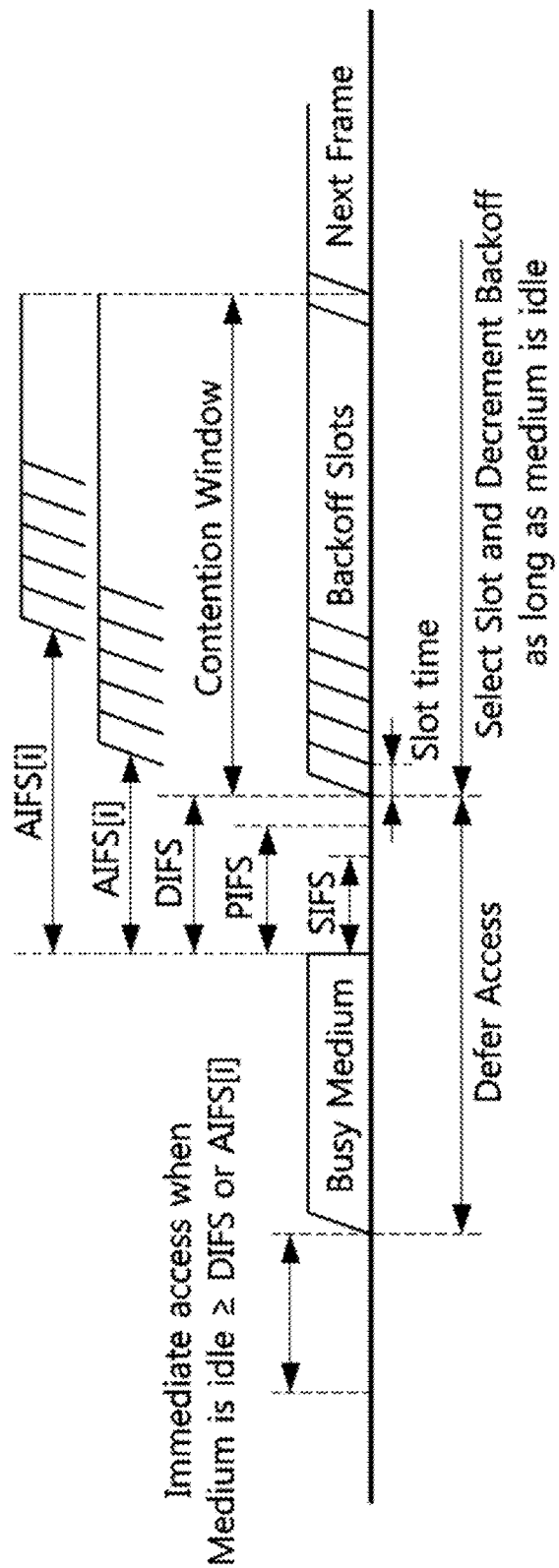
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after an SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
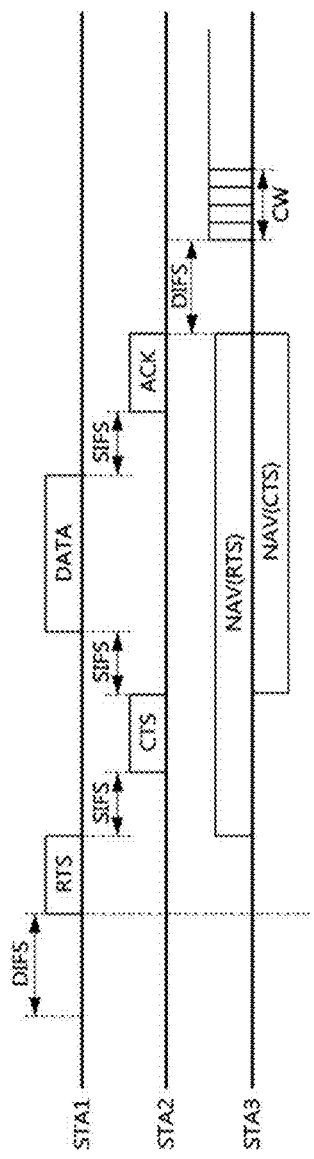
FIG. 5 illustrates a Carrier Sense Multiple Access/Collision Avoidance (CSMA/CA) based frame transmission procedure, in accordance with some embodiments of the present disclosure.
Figure 8:
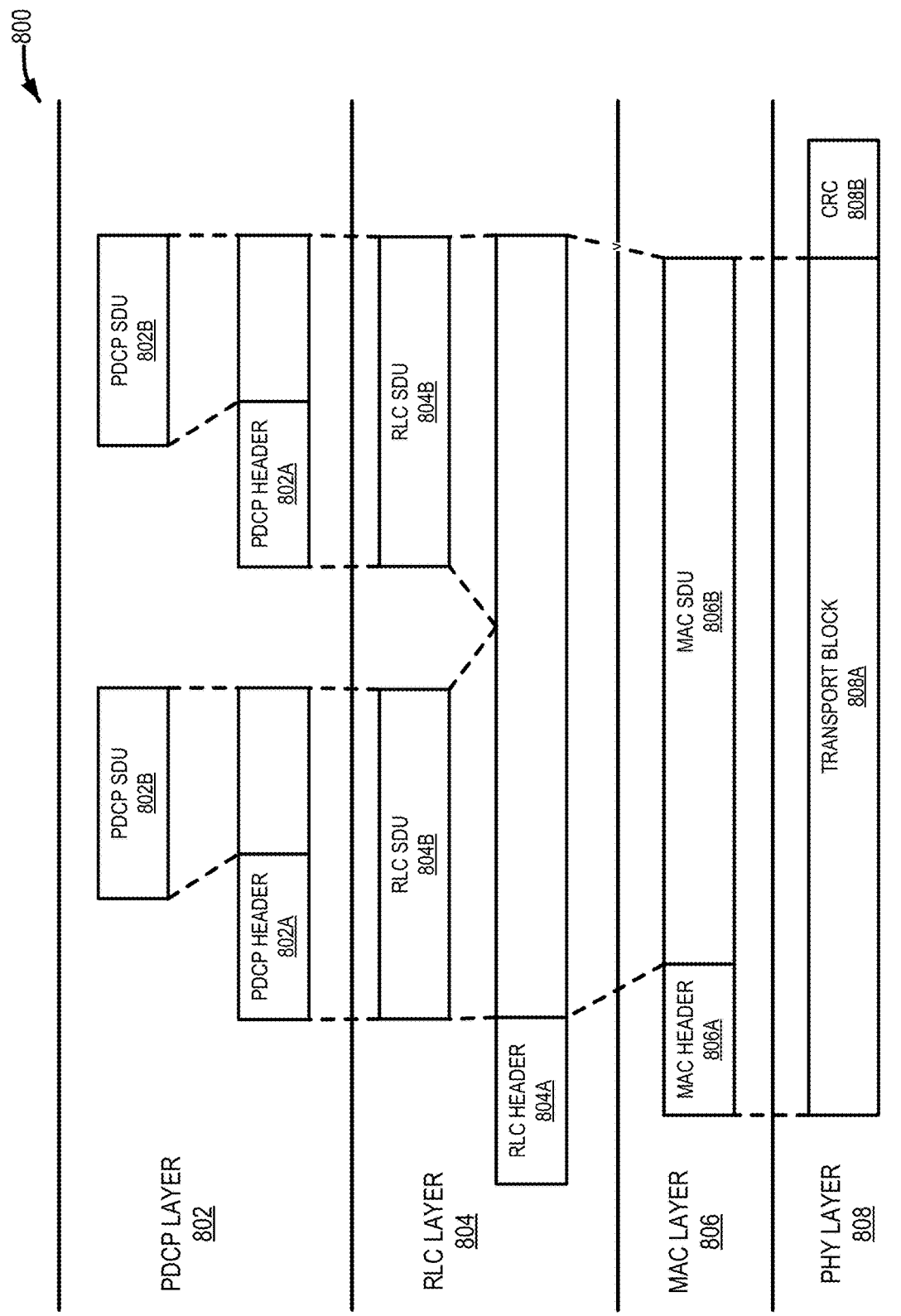
FIG. 8 shows a packet transmission process in a multi-layer structure of a cellular mobile communication network, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after an SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after an SIFS period elapses from a time when the CTS frame has been completely received. Upon successfully receiving the data frame, the station STA2 may transmit an ACK frame as a response to the data frame after an SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Lager than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

HARQ technology can be used in cellular systems (e.g., Long Term Evolution (LTE) and LTE-Advanced systems). The packet transmission process in a multilayer structure of a cellular mobile communication network is shown in FIG.

8. As shown, the multilayer structure 800 includes a Packet Data Convergence Protocol (PDCP) layer 802, a Radio Link Control (RLC) layer 804, a Media Access Control (MAC) layer 806, and a Physical (PHY) layer 808. In this configuration, PDCP Service Data Units (SDUs) 802B are combined with corresponding PDCP headers 802A and passed to the RLC layer 804. In particular, the combined PDCP SDUs 802B and PDCP headers 802A form RLC SDUs 804B. The RLC layer 804 appends a RLC header 804A to one or more RLC SDUs 804B and this combined structure forms a MAC SDU 806B that is passed to the MAC layer 806. After the RLC SDU 804B is configured in the RLC layer 804, which performs scheduling through the PDCP layer 802, the MAC header 806A is attached at the MAC layer 806. Then the combined data is transmitted in the form of a transport block 808A, including a CRC field 808B, for verification in the PHY layer 808. In cellular systems, HARQ technology can be performed through the operation of (1) the MAC layer 806, which determines whether to retransmit and performs a response request and (2) the PHY layer 808, which manages the storage and soft combining of repeatedly transmitted packets.

Figure 9:
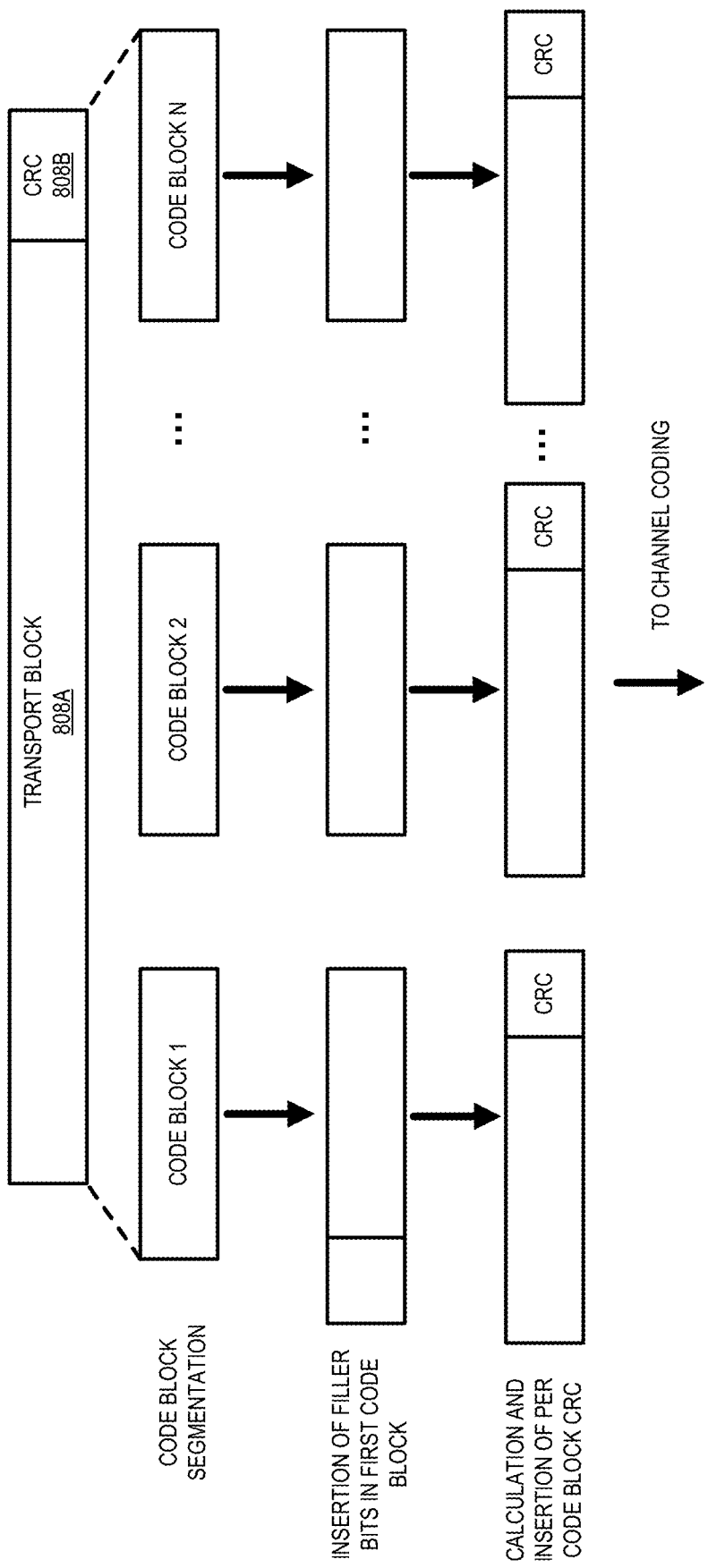
FIG. 9 shows a breakdown of a transport block, including a number of codewords of the transport block, in accordance with some embodiments of the present disclosure.

Retransmission in cellular systems can be performed in units of transport blocks 808A that are transmitted at the PHY layer 808. If the CRC check of the transport block 808A fails at the receiving station, the receiving station notifies the transmitting station to perform a retransmission via HARQ. As shown in FIG. 9, a transport block 808A can be divided into a number of code blocks/codewords (CW) according to the length of the transport block 808A. For example, as shown in FIG. 9, the transport block 808A is segmented into code blocks 1-N and filler bits are inserted into the first code block. Further, each code block includes CRC for self-verification. In some embodiments, a HARQ process in a cellular system operates with transport block units rather than in code block units.

Figure 10:
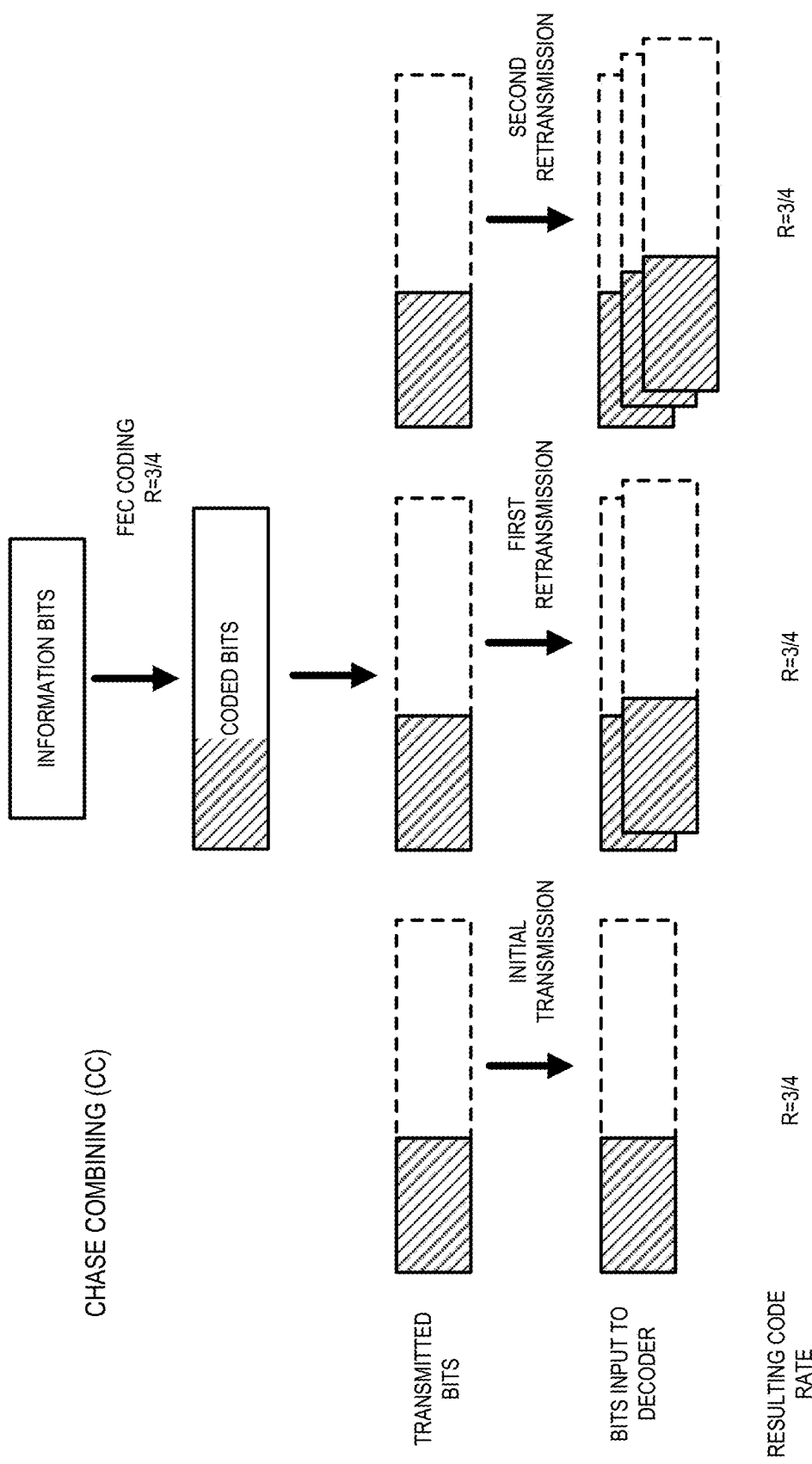
FIG. 10 shows a Chase Combining (CC) Hybrid Automatic Repeat Request (HARQ) technique, in accordance with some embodiments of the present disclosure.

As noted above, there can be two types of HARQ processes: Chase Combining (CC) HARQ and Incremental Redundancy (IR) HARQ. FIG. 10 shows a CC-HARQ technique, according to one example embodiment. As shown, information bits are processed/coded into coded bits. In an initial transmission, some of the coded bits (shaded in FIG. 10) were not correctly received/decoded by the receiving station. In response, the transmitting station repeatedly retransmits the same coded bits generated in the same transport block according to the CC-HARQ scheme. The receiving station improves performance by combining each iteration of the coded bits. Namely, since the receiver uses both the current and the previously received subpackets/codewords for decoding data, the error probability in decoding decreases as the number of used subpackets increases.

Figure 11:
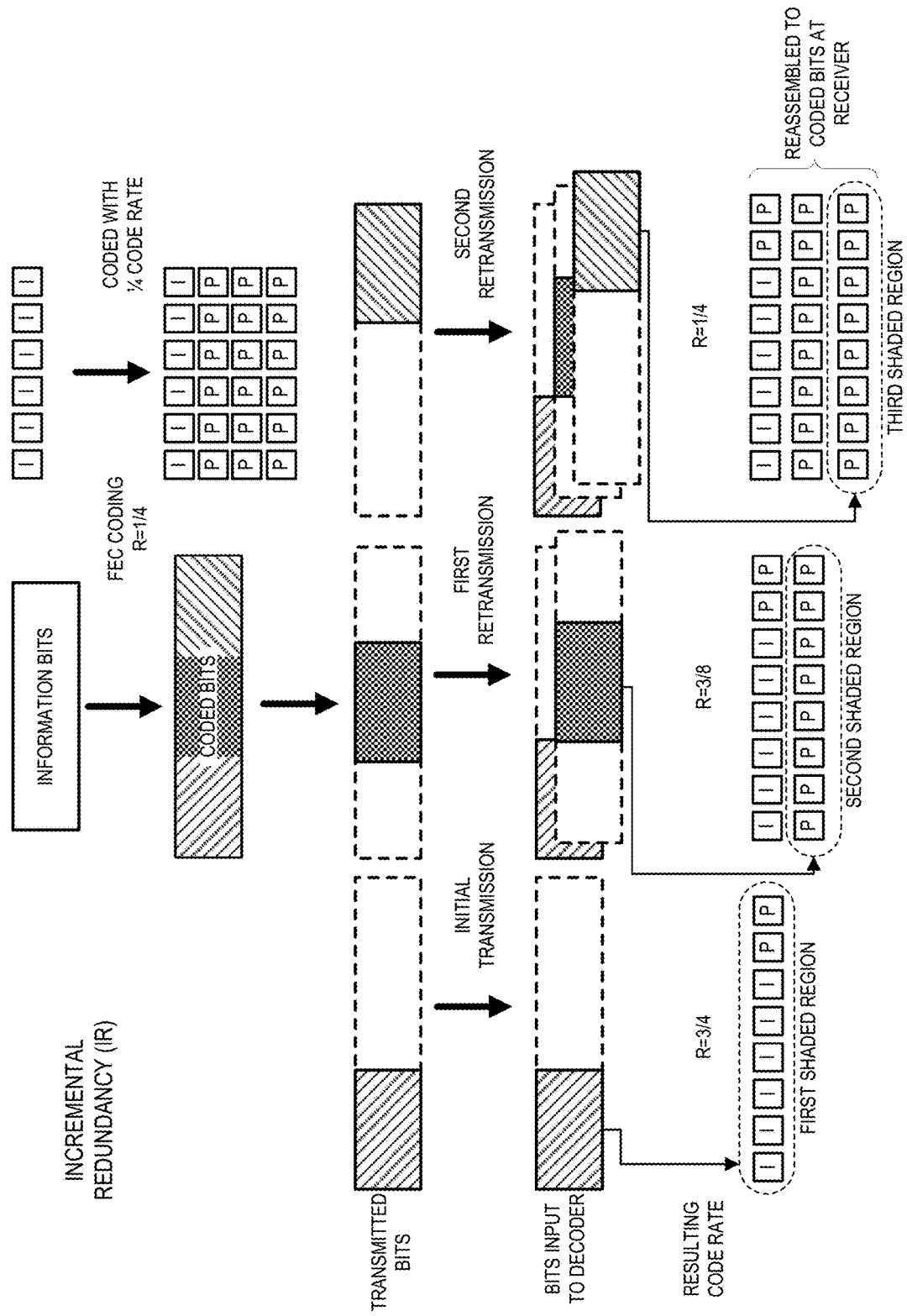
FIG. 11 shows an Incremental Redundancy (IR) HARQ technique, in accordance with some embodiments of the present disclosure.

FIG. 11 shows an IR-HARQ technique, according to one example embodiment. As shown, information bits are processed/coded into coded bits. Incremental redundancy (IR) is the method of sending different portions of information generated through channel coding in the same transport block for initial transmission and retransmission. In particular, different puncturing patterns are used for each subpacket such that the signal changes for each retransmitted subpacket in comparison to the originally transmitted subpacket. The receiver improves performance by utilizing newly received information with the previously received information.

In cellular systems, a HARQ process operating in one transport block may operate in parallel using multiple stop and wait protocols. When a new transport block is transmitted, a new data indicator can be used to inform the receiving station that the existing transport block transmission has ended and a new transport block transmission has started. The HARQ operation scheme may be classified into an asynchronous scheme, in which retransmission may be performed at any time on the time axis, and a synchronous scheme, in which retransmission can be performed only after a predetermined time from completion of the previous transmission. For example, as shown in FIG. 11, information bits are coded into coded bits (represented with three different shaded regions) with a ¼ coding rate. In particular, the resulting coded bits have ¼ data bits and ¾ parity bits. At initial transmission, transmitted bits (the first shaded region with diagonal lines), which are punctured from the entirety of the coded bits, include data and parity bits. The punctured bits include ¾ data bits and ¼ parity bits from entirety of the coded bits. Thus, the resulting code rate after initial transmission is ¾. If the frame exchange is not completed (e.g., one or more codewords were not successfully received/decoded), retransmission will begin. A first retransmission transfers the second region and the bits in the second region are punctured with a bit pattern from coded bits, and these bits do not include any data bits but instead only include parity bits. Thus, the resulting coding rate is updated to ⅜. In a similar way, the second retransmission also includes only parity bits, so the resulting code rate is calculated as ¼.

Figure 12:
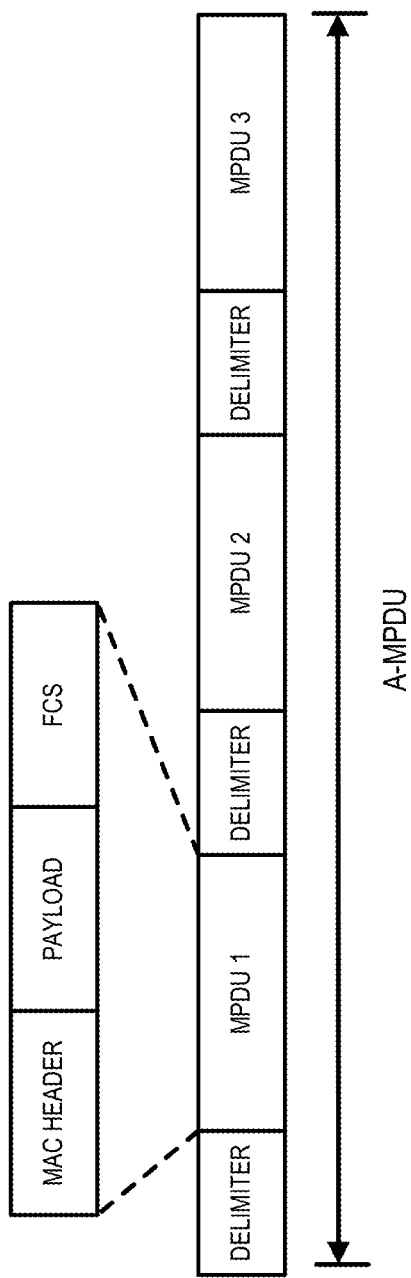
FIG. 12 shows an Aggregated Media Access Control (MAC) Protocol Data Unit (MPDU), in accordance with some embodiments of the present disclosure.

The retransmission protocol of some WLAN systems can be performed in MAC Protocol Data Units (MPDUs). In these embodiments, a CRC field is located at the end of each MPDU. If the receiving station fails to verify based on the CRC field, retransmission is requested by the receiving station. The configuration of an MPDU is performed at the MAC layer in a WLAN system while the CRC field is added in a transport block at the PHY layer in a cellular system. In addition, in the case of aggregated MPDUs (A-MPDUs), as shown in FIG. 12, multiple MPDUs (e.g., MPDUs 1-3) can be included in one PSDU (i.e., the A-MPDU). In particular, as shown in FIG. 12, each MPDU 1-3 is separated by a delimiter in an A-MPDU. Further, each MPDU includes a MAC header field, payload field, and Frame Check Sequence (FCS) field.

In some embodiments, each MPDU in an A-MPDU contains a CRC field, and the retransmission is made only for the failed MPDUs. However, since the PHY layer of WLAN systems recognize the entire A-MPDU as a PSDU and operates in units of PSDUs, the PHY layer does not know the boundary of the MPDUs, which is configured in the MAC layer. However, HARQ methods in a WLAN system should be able to be performed in units of codewords or MPDUs.

Figure 13:
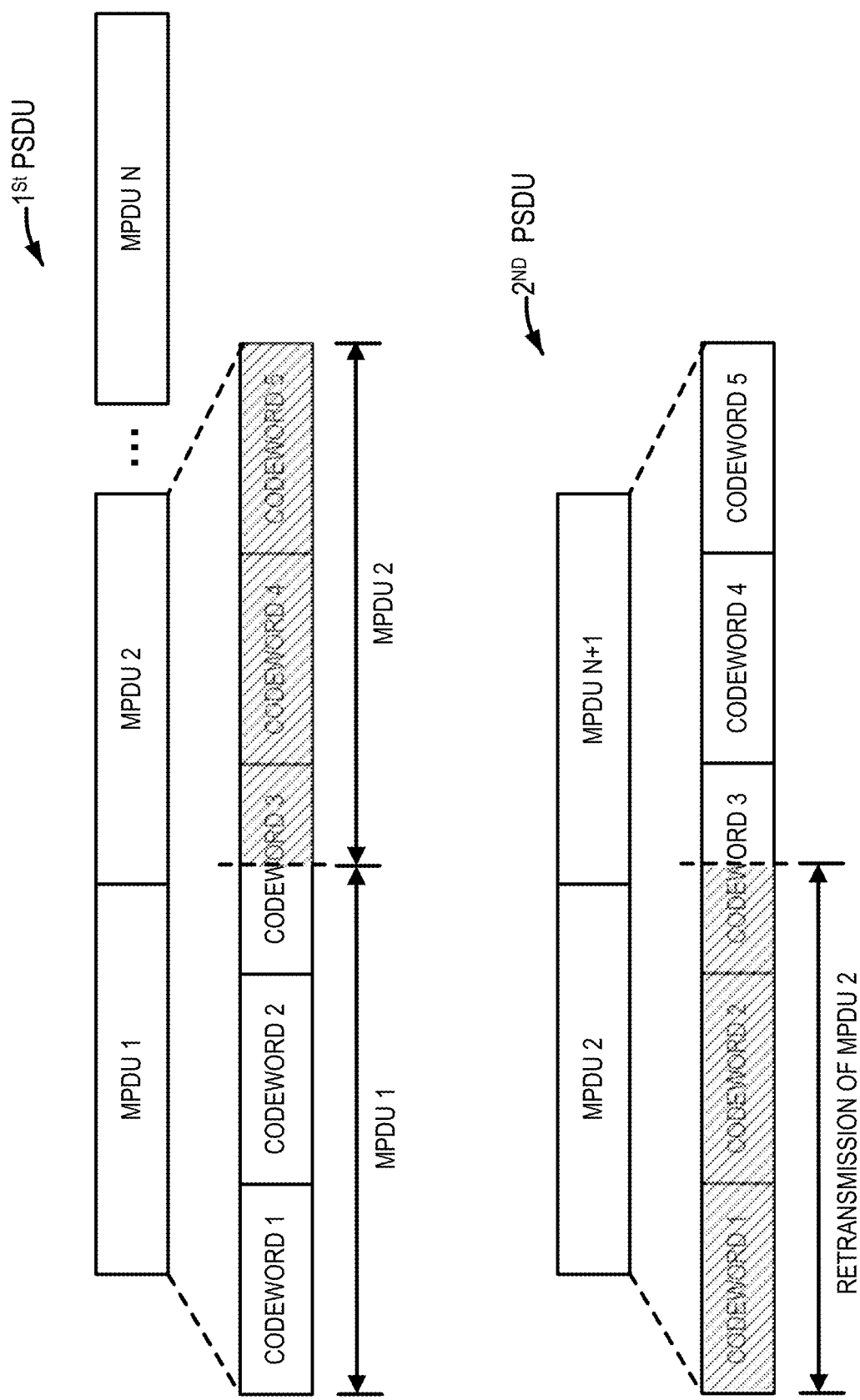
FIG. 13 shows a retransmission being performed because an MPDU was not properly received/decoded, in accordance with some embodiments of the present disclosure.
Figure 14:
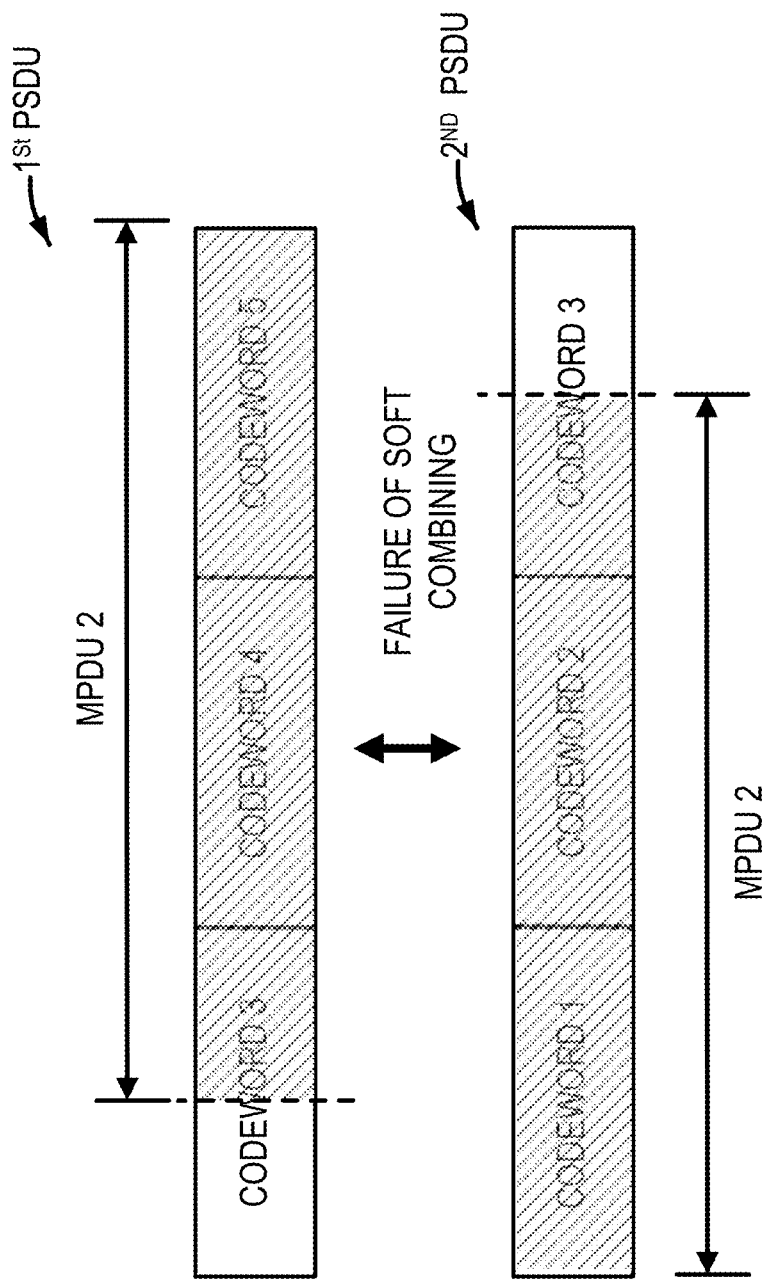
FIG. 14 shows the same MPDU in different Physical layer (PHY) Service Data Units (PSDUs), in accordance with some embodiments of the present disclosure.

When the PHY layer performs retransmission via a HARQ technique and without recognizing boundaries of MPDUs, problems may occur. For example, when the A-MPDU, including one or more MPDUs, is transmitted in a PSDU format, the PHY layer configures the codewords according to the length of the input information and without distinguishing MPDU boundaries. FIG. 13 shows (1) a transmission of a first PSDU for MPDUs 1-N (defined by codewords 1-5 for the MPDUs 1 and 2) and (2) a retransmission being performed because the CRC check of MPDU 2 in the first PSDU has failed. In this situation, a new/second PSDU is formed that includes MPDU 2 along with a new MPDU (i.e., MPDU N+1) and codewords of the new PSDU are configured differently from the initial PSDU transmission and according to the position of MPDU 2 in the newly created PSDU. In this configuration, it is impossible for the receiving station to soft combine the existing codewords acquired for MPDU 2 for HARQ. For example, as shown in FIG. 14, part of codeword 3 and all of codewords 4 and 5 of the $1^{st}$ PSDU represent MPDU 2 in the first transmission. In contrast, all of codewords 1 and 2 and part of codeword 3 in the $2^{nd}$ PSDU represent MPDU 2 in the second transmission. Thus, it is unclear how the combination between these PSDUs would be performed without understanding the boundaries of the MPDUs and codewords in the PSDUs.

One solution to this problem is to transmit the same PSDU (i.e., the A-MPDU) every time (i.e., the initial transmission and the retransmission are identical). However, in this case, since the successfully transmitted MPDUs in the first A-MPDU/transmission are also retransmitted, the retransmission of the entire PSDU increases resource waste.

Figure 15:
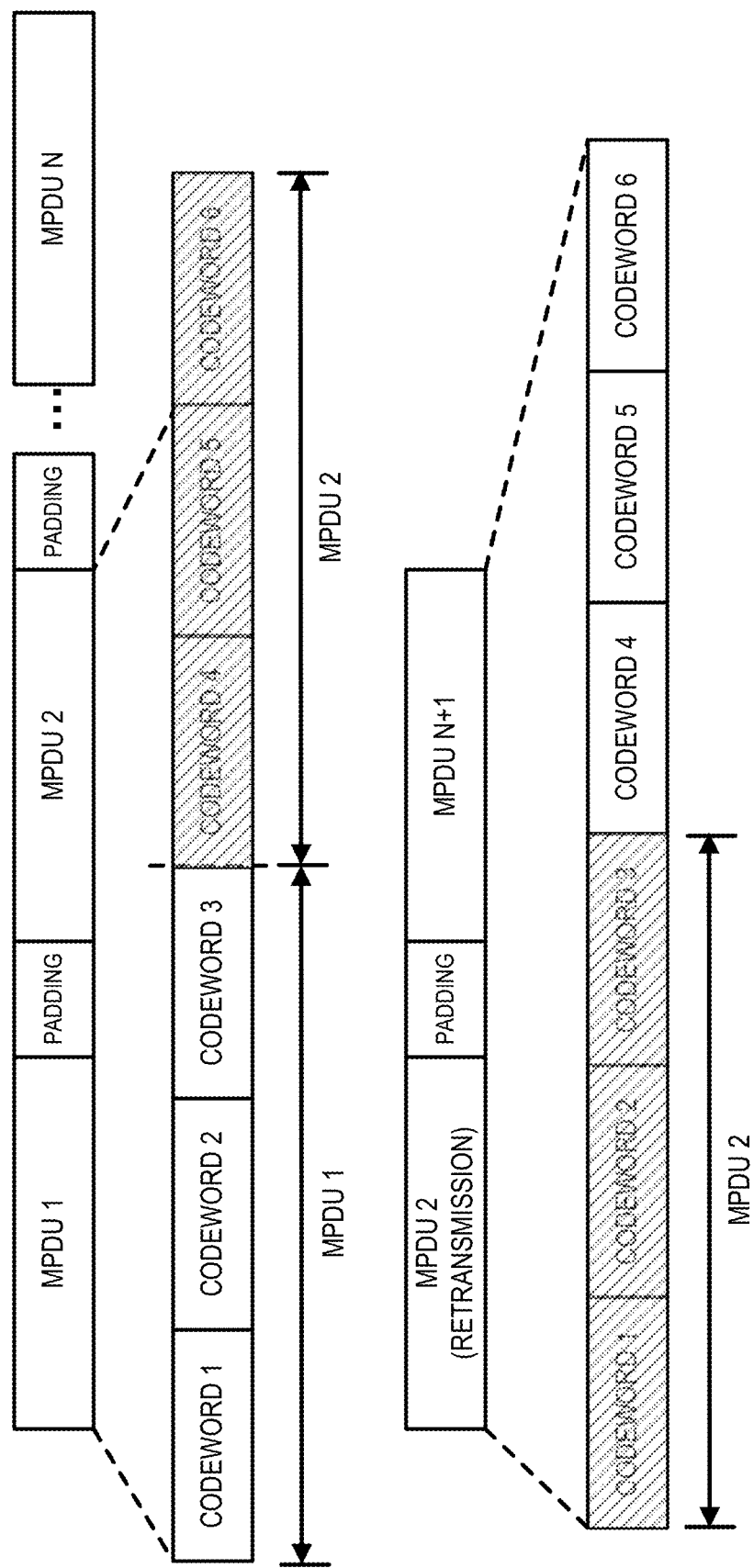
FIG. 15 shows an A-MPDU with added padding between MPDUs, in accordance with some embodiments of the present disclosure.

As shown in FIG. 15, padding can be inserted at the end of each MPDU according to codeword boundaries such that MPDUs are represented by only whole codewords. Since MPDU and padding are composed of multiples of codewords, the codewords of the same type can be configured when an MPDU is retransmitted and soft combining is possible at the receiving station.

Figure 16:
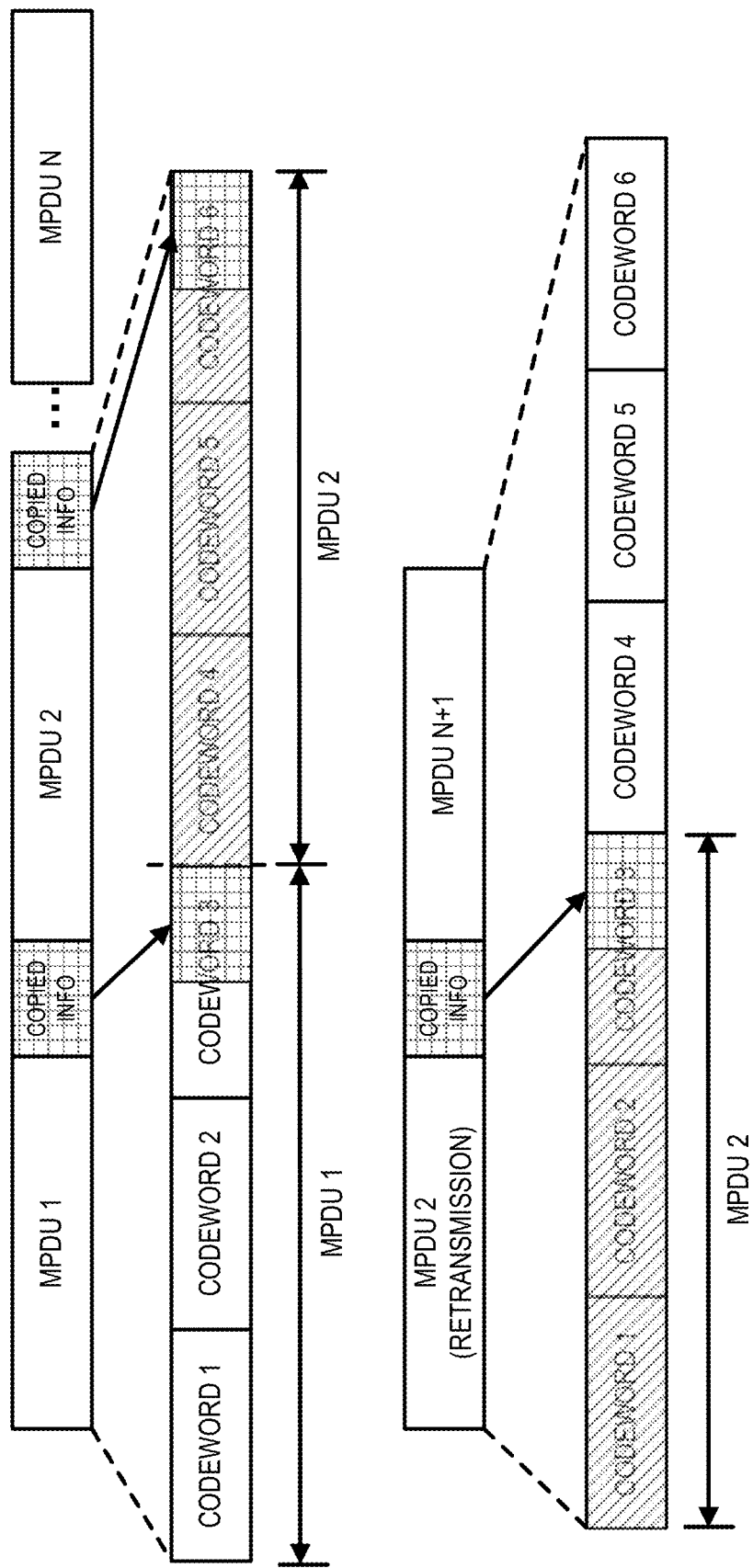
FIG. 16 shows an A-MPDU with added padding between MPDUs, in accordance with some embodiments of the present disclosure.

However, since the padding may waste resources as it does not include usable data, the information contained in the MPDU can be repeated in the padding as shown in FIG. 16. For example, the copied information may include the transmission and/or reception MAC addresses of an MPDU, which is already present in MPDUs, or a separate CRC field for additional authentication/verification.

Figure 17:
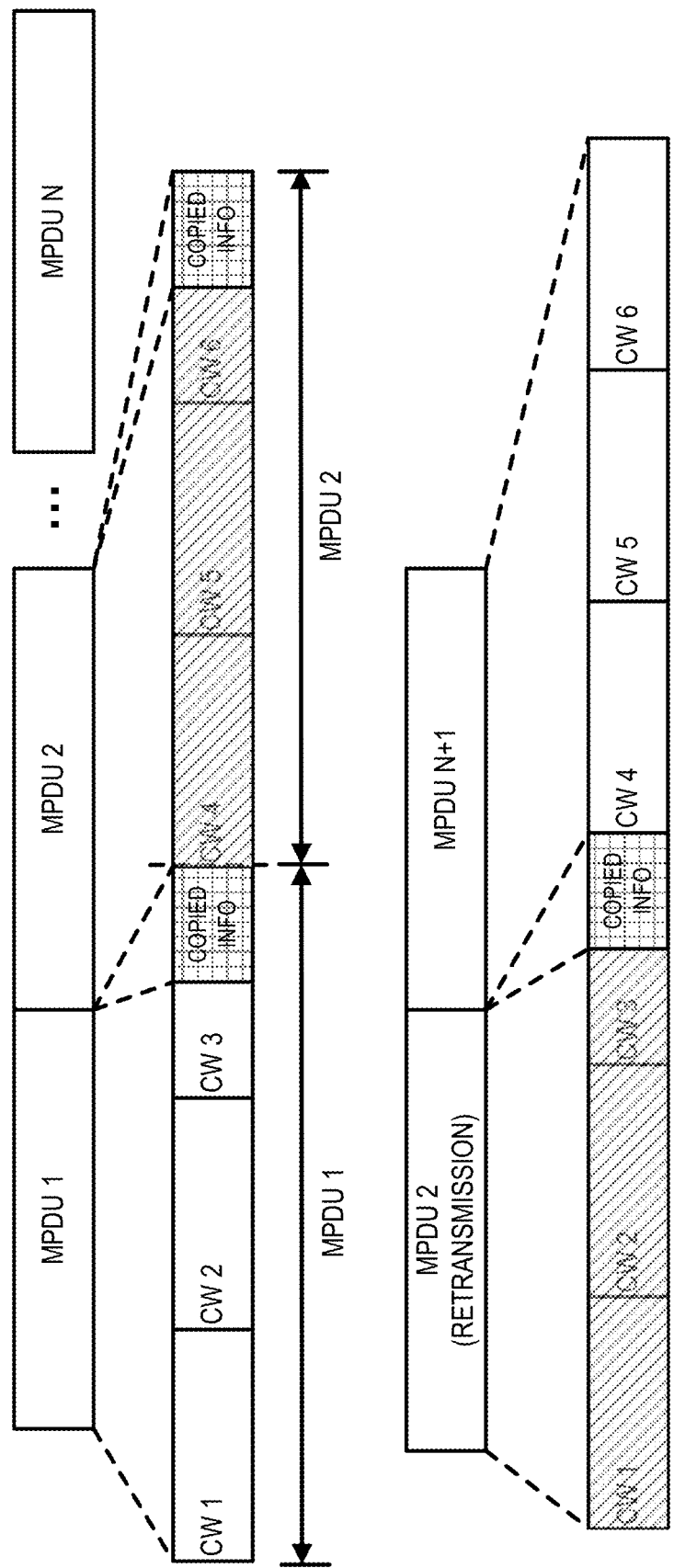
FIG. 17 shows an A-MPDU with added padding between MPDUs, in accordance with some embodiments of the present disclosure.

The attachment of padding to an MPDU can be performed based on codeword boundaries at the PHY layer, where channel coding (e.g., LDPC or BCC) is performed, as shown in FIG. 17, rather than at MPDU boundaries enforced at the MAC layer. In the added padding, the front coded bit or bits may be repeated for efficient use of resources. For this, the length of each MPDU, constituting the PSDU, must be, unlike other methods, indicated by the MAC layer to the PHY layer. Through this, the PHY layer can match the codewords at each end boundary of an MPDU.

Figure 18:
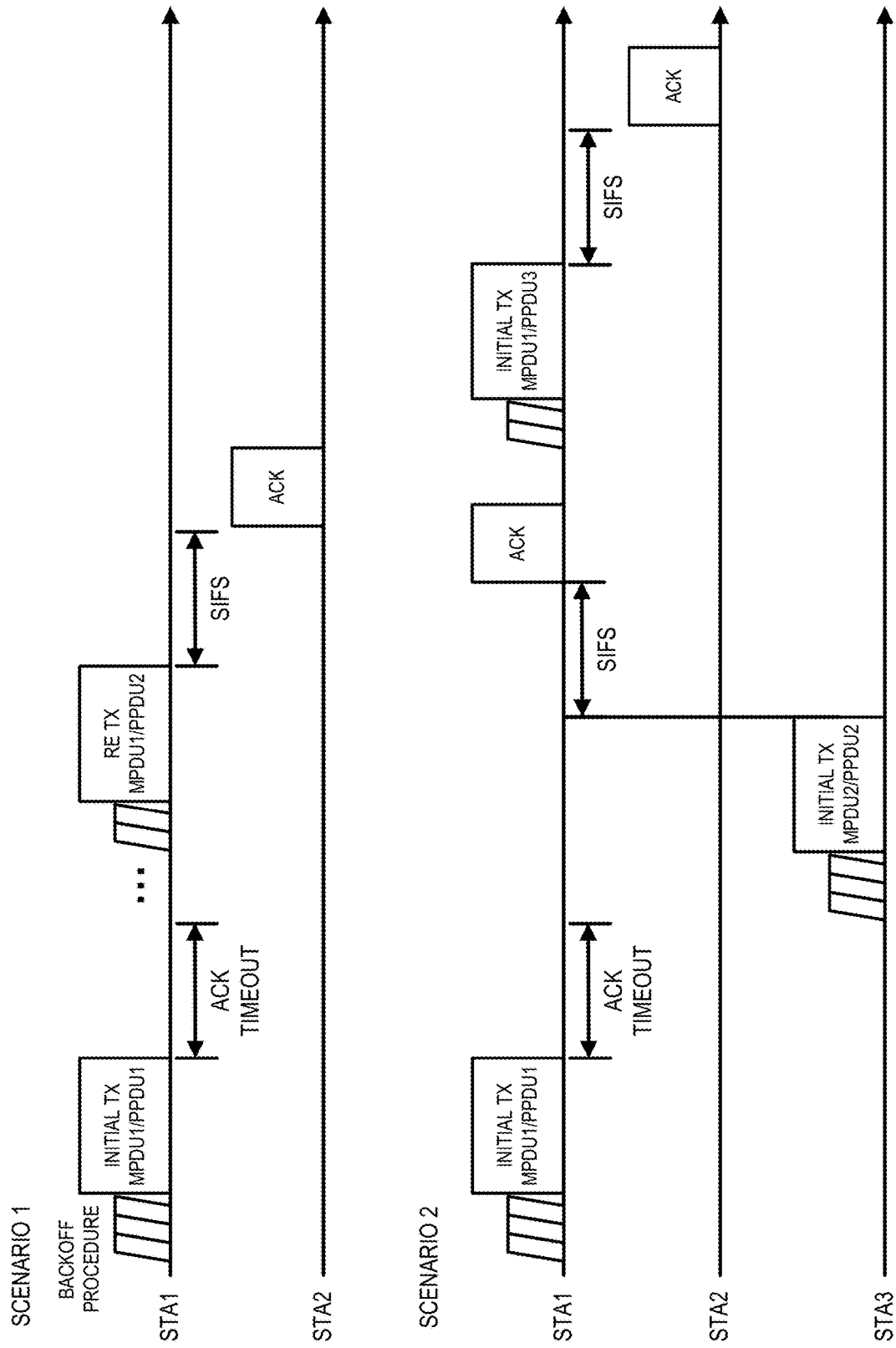
FIG. 18 shows varied scenarios for HARQ in a wireless system, in accordance with some embodiments of the present disclosure.

In WLAN systems, multiple terminals share one wireless channel. Accordingly, a third party's transmission can be included during the retransmission of one packet. For example, as shown in FIG. 18, the transmission and reception of other MPDUs in a PPDU may be inserted between the initial transmission and the first retransmission of the first MPDU in a first PPDU. Namely, in scenario 1 shown in FIG. 18, in which there are only two stations (STA1 and STA2), STA1 transmits MPDU1 to STA2 in PPDU1. However, after an acknowledgement (ACK) timeout period without receipt of an acknowledgement form STA2, STA1 performs a backoff procedure and regains control of the channel to retransmit MPDU1 to STA2 in PPDU2. When the retransmission of MPDU1 is successful, STA2 transmits an acknowledgment after an SIFS period.

In contrast, in scenario 2 shown in FIG. 18, in which there are three stations (STA1, STA2, and STA3), STA1 transmits MPDU1 via PPDU1 to STA2. However, after an acknowledgement (ACK) timeout period without receipt of an acknowledgement form STA2, STA3 performs a backoff procedure to gain control of the shared medium/channel and transmits MPDU2 via PPDU2 to STA1 on the channel. Following a SIFS period, STA1 acknowledges MPDU2 in PPDU2 and thereafter performs a backoff and regains control of the channel to retransmit MPDU1 in PPDU3 to STA2. In this case, the retransmission of MPDU1 is successful and STA2 transmits an acknowledgment after a SIFS period.

Therefore, to apply HARQ to a WLAN system, the HARQ process must be defined to account for these varied scenarios. In one embodiment, a continuous transmission sequence is established within a limited time for HARQ. For example, as shown in scenario 1 of FIG. 19, STA1 and STA2 are continuously exchanging data and corresponding acknowledgement (ACK) and negative ACK (NACK) frames to indicate successful or unsuccessful receipt of previous MPDUs in PPDUs. In particular, as shown in scenario 1 of FIG. 19, STA1 performs a backoff procedure to gain control of a shared channel. Thereafter, STA1 transmits MPDU1 to STA2 via PPDU1. After a SIFS period, STA transmits an ACK/NACK frame to indicate that MPDU1 was not successfully received. Following another SIFS period, STA 1 retransmits MPDU1 to STA2 via PPDU2 and STA2 performs HARQ combining based on the previous version of MPDU1, which was buffered along with the corresponding PSDU, and the currently received version of MPDU1 from PPDU2. STA1 and STA2 can continue this process (e.g., via another transmission of MPDU1 via PPDU3) until MPDU1 is entirely received using HARQ combining. Thus, scenario 1 of the HARQ procedure prevents transmissions from other terminals interrupting the backoff transmission after a transmission failure by continually transmitting messages between STA1 and STA2.

Figure 19:
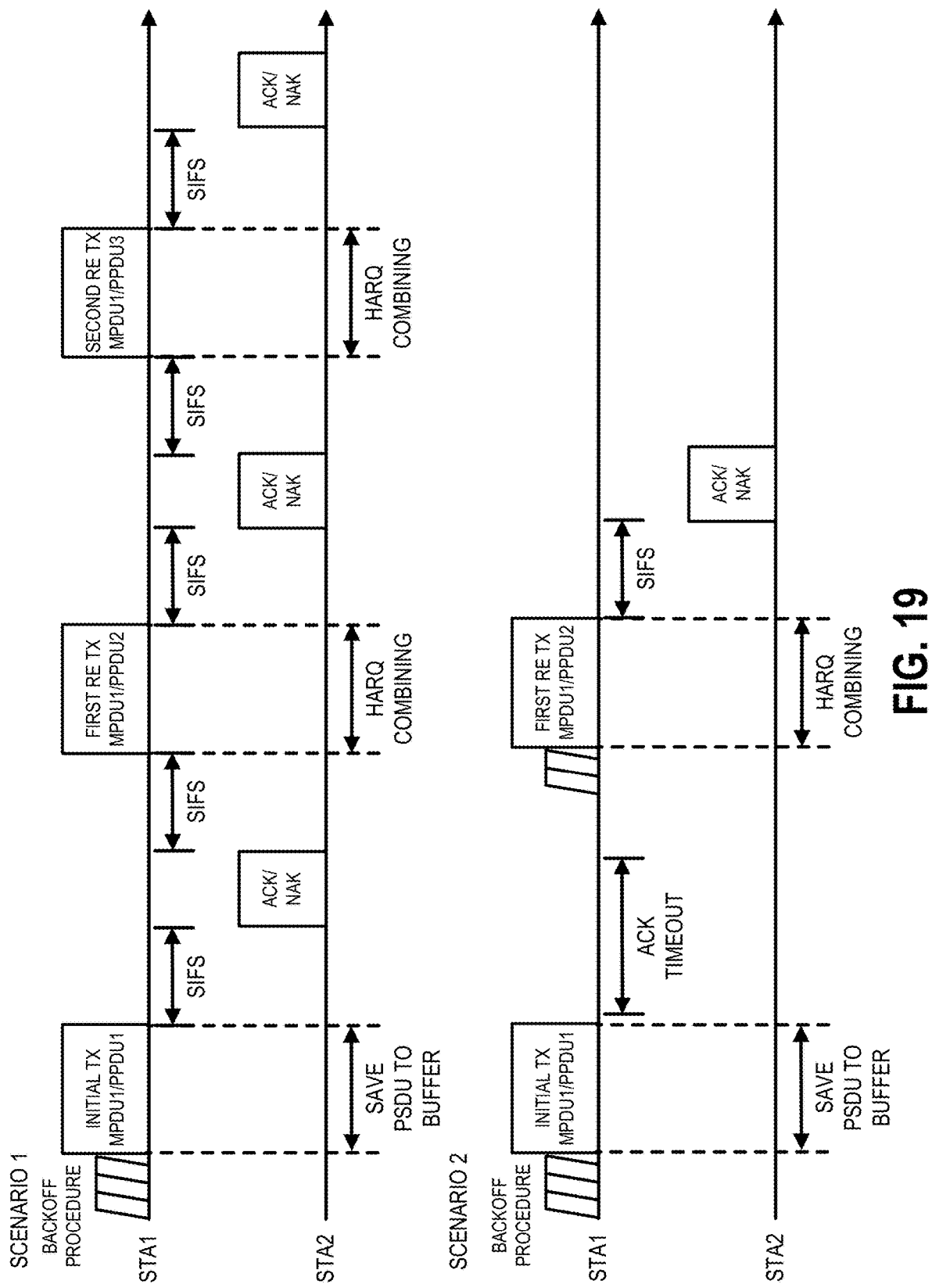
FIG. 19 shows varied scenarios for HARQ in a wireless system, in accordance with some embodiments of the present disclosure.

Scenario 2, shown in FIG. 19, shows that the transmitting station STA1 makes an initial transmission of MPDU1 via PPDU1. The receiving station STA2 only buffers the latest received frame from a valid transmitter (e.g., a same BSS or associated AP/STA) in a soft combining buffer. Accordingly, a frame that is not addressed to the receiving station STA1 and is transmitted from a third party station will not be buffered in the soft combining buffer. Upon failure to receive an acknowledgement for MPDU1, the transmitting station STA1 retransmits MPDU1 via PPDU2 and the receiving station STA2 combines the buffered MPDU1 (even though each of the codewords may not have been properly received and/or decoded) with the newly received MPDU1. When this combining successfully produces MPDU1, the receiving station STA2 transmits an acknowledgment, which ends the HARQ operation.

Figure 20:
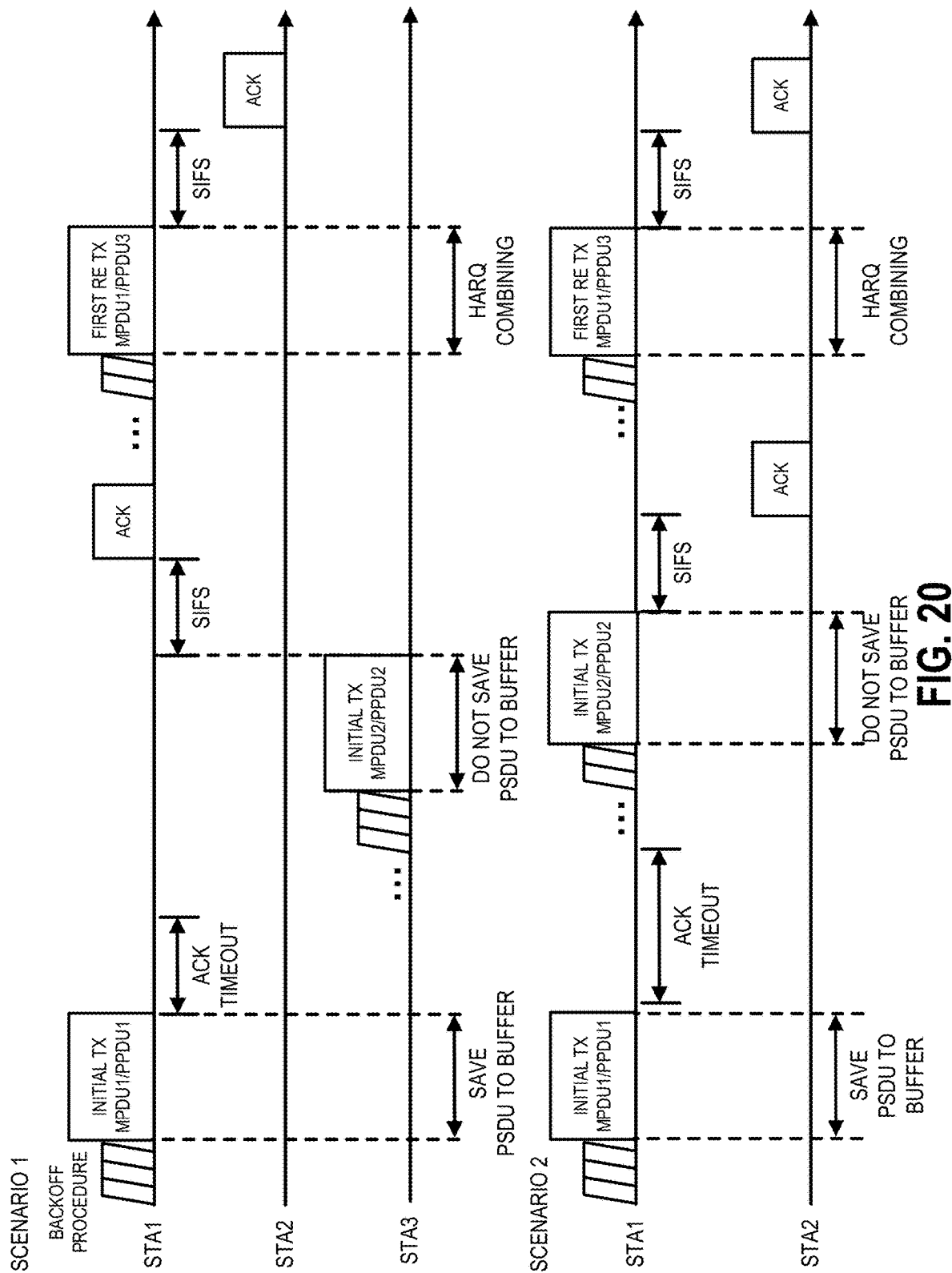
FIG. 20 shows varied scenarios for HARQ in a wireless system, in accordance with some embodiments of the present disclosure.

In another embodiment (i.e., a second HARQ technique), a discontinuous transmission sequence is used but a time is not limited for the HARQ process. As shown in FIG. 20, the transmission of STA3 may be inserted in between the initial transmission and the first retransmission between STA1 and STA2. In particular, in scenario 1 of FIG. 20, the transmitting station STA1 transmits MPDU1 in PPDU1 to receiving station STA2. Even though the MPDU1 and corresponding PPDU1 are not successfully received and decoded, station STA2 buffers these items for possible HARQ combining at the PHY layer. Following an ACK timeout period without receiving an ACK/NACK for MPDU1, the transmitting station STA1 loses control of the shared channel and the station STA3 performs a backoff procedure to gain control of the shared channel to transmit MPDU2 in PPDU2 to station STA1. Following successful receipt of MPDU2 and a SIFS period, station STA1 transmits an ACK for MPDU2 to station STA3. Since the MPDU2/PPDU2 was successfully received, station STA1 does not need to buffer these items for potential HARQ combining at the PHY layer. Thereafter, station STA3 loses control of the shared channel and station STA1 performs a backoff procedure to again gain control of the shared channel. Based on a failure to successfully transmit MPDU1/PPDU1 to station STA2, station STA1 retransmits MPDU1 via PPDU3 to station STA2. Station STA2 successfully receives and decodes MPDU1 in PPDU3 (potentially using HARQ combining and the original transmission of MPDU1). Based on this success, station STA2 does not buffer the second instance of MPDU1 and can clear the buffer of the original version of MPDU1. Further, station STA2 can transmit an ACK to station STA1 to confirm receipt of MPDU1. Similarly, the transmission between STA1 and STA2 can include other MPDUs in the transmission process. For example, in scenario 2 of FIG. 20, the transmitting station STA1 transmits MPDU1 in PPDU1 to receiving station STA2. Even though the MPDU1 and corresponding PPDU1 are not successfully received and decoded, station STA2 buffers these items for possible HARQ combining. Following an ACK timeout period without receiving an ACK/NACK for MPDU1, the transmitting station STA1 loses control of the shared channel but station STA1 performs a backoff procedure to regain control of the shared channel to transmit MPDU2 in PPDU2 to station STA2. Following successful receipt of MPDU2 and a SIFS period, station STA2 transmits an ACK for MPDU2 to station STA1. Since the MPDU2/PPDU2 was successfully received, station STA2 does not need to buffer these items for potential HARQ combining. Thereafter, station STA1 loses control of the shared channel and station STA1 performs a backoff procedure to again gain control of the shared channel. Based on a failure to successfully transmit MPDU1/PPDU1 to station STA2, station STA1 retransmits MPDU1 via PPDU3 to station STA2. Station STA2 successfully receives and decodes MPDU1 in PPDU3 (potentially using HARQ combining and the original transmission of MPDU1). Based on this success, station STA2 does not buffer the second instance of MPDU1 and can clear the buffer of the original version of MPDU1. Further, station STA2 can transmit an ACK to station STA1 to confirm receipt of MPDU1.

Figure 21:
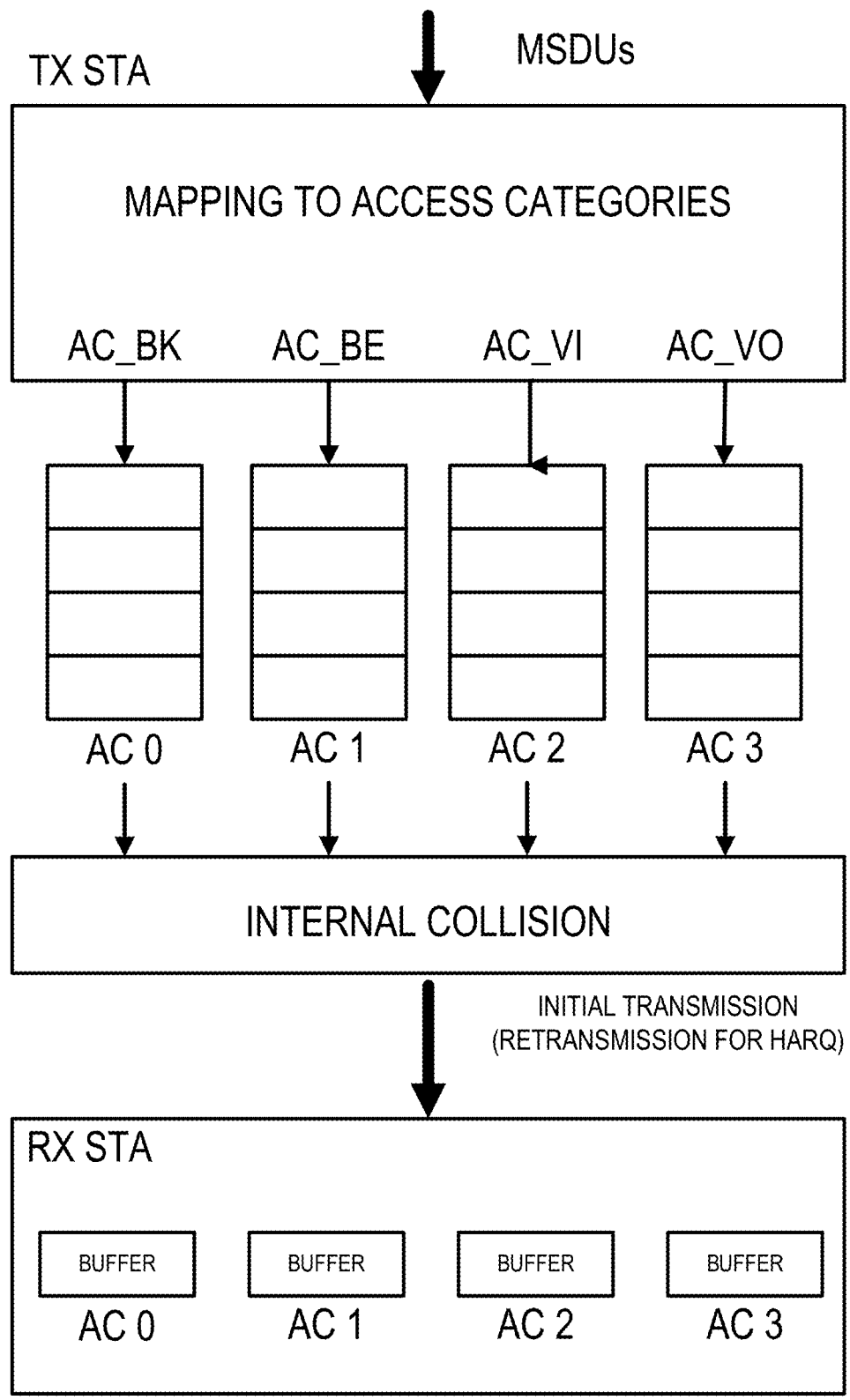
FIG. 21 shows processing of data from different access categories, in accordance with some embodiments of the present disclosure.

In particular, a WLAN system can have transmission categories, called Access Categories (AC), as shown in FIG. 21, and packets transmitted from higher layers acquire transmission opportunities through contention-based Enhanced Distributed Channel Access (EDCA). As shown in FIG. 21, a transmitting station (TX STA) maps MSDUs from different access categories (e.g., background (AC_BK), best effort (AC_BE), video (AC_VI), and voice (AC_VO)) into AC buffers (AC 0, AC 1, AC 2, and AC 3). As the EDCA process is performed, the transmitting station handles any internal collisions and selects an AC and corresponding data for transmission or retransmission to the receiving station (RX STA). The receiving station can buffer this data in corresponding AC buffers. Thus, packets with different ACs can be transmitted in a mixed format on the channel over time. Since the receiving station in the WLAN cannot anticipate the contention result of the EDCA that is performed by the transmitting station, the receiving station cannot predict which AC a received packet will include.

Figure 22:
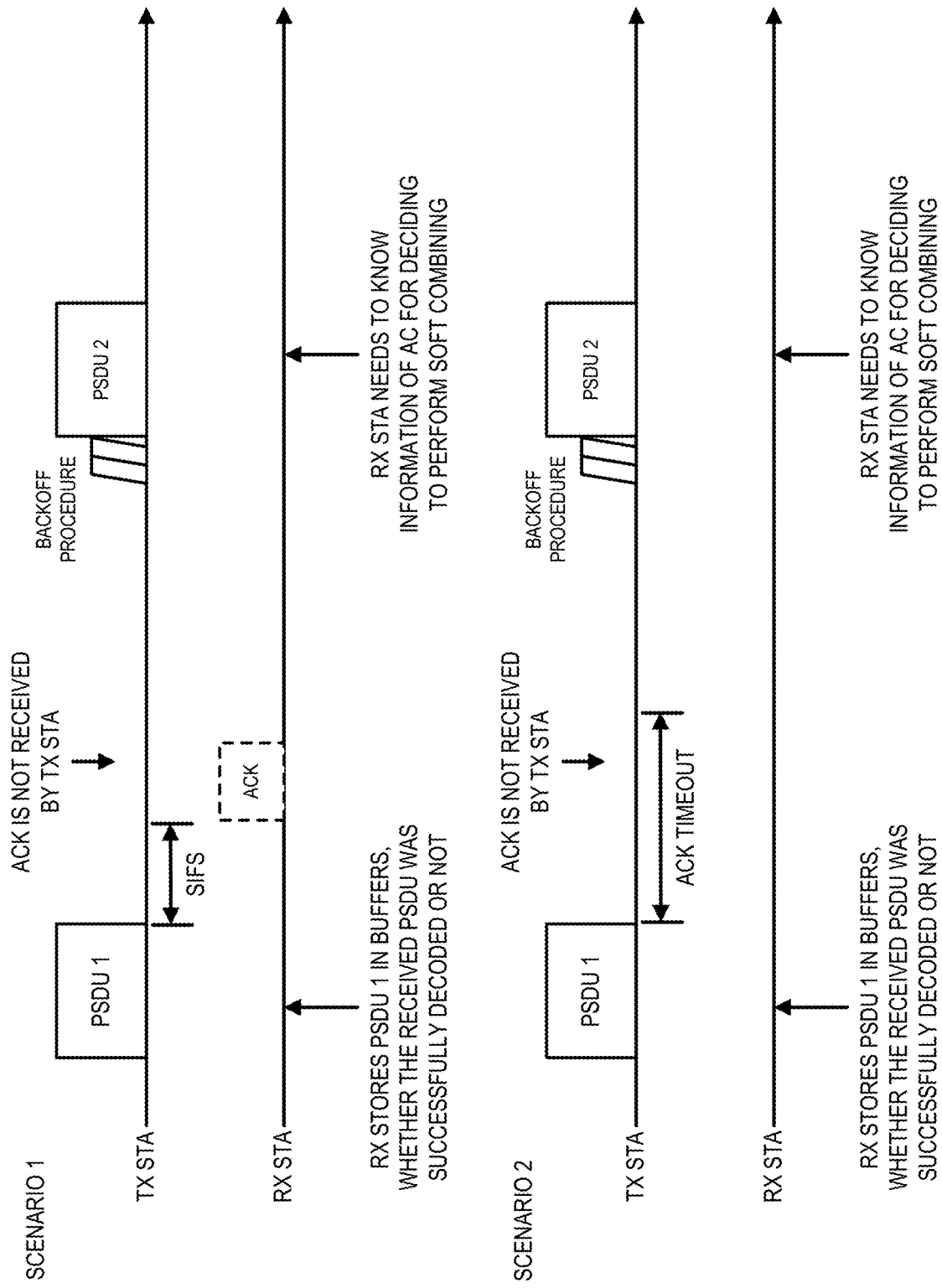
FIG. 22 shows performance of a HARQ operation based on access categories, in accordance with some embodiments of the present disclosure.

In FIG. 22, though PSDU 1, corresponding to AC3, was received by the receiving station, PSDU 1 was stored in an internal buffer for a HARQ operation. PSDU 1, corresponding to AC3, needs to be retransmitted for a HARQ operation, but AC2 was first selected through EDCA contention by the transmitting station and PSDU 2 corresponding to AC2 was instead transmitted.

To properly operate the HARQ process, the receiving station must recognize that the currently received PSDU 2 is a packet different from the previously received PSDU 1 (i.e., a packet with a different AC). As shown in scenario 1 of FIG. 22, although the receiving station correctly receives the transmitted packet and transmits an ACK frame in response, the transmitting station may not receive the corresponding ACK frame. Then, the transmitting station may perform retransmission via HARQ when either an ACK was transmitted and not received (scenario 1) or an ACK was never received (scenario 2). Therefore, the receiving station should initialize the corresponding buffer at the time when new packet is received for the corresponding station and regardless of whether the packet was correctly/successfully received/decoded.

Figure 23:
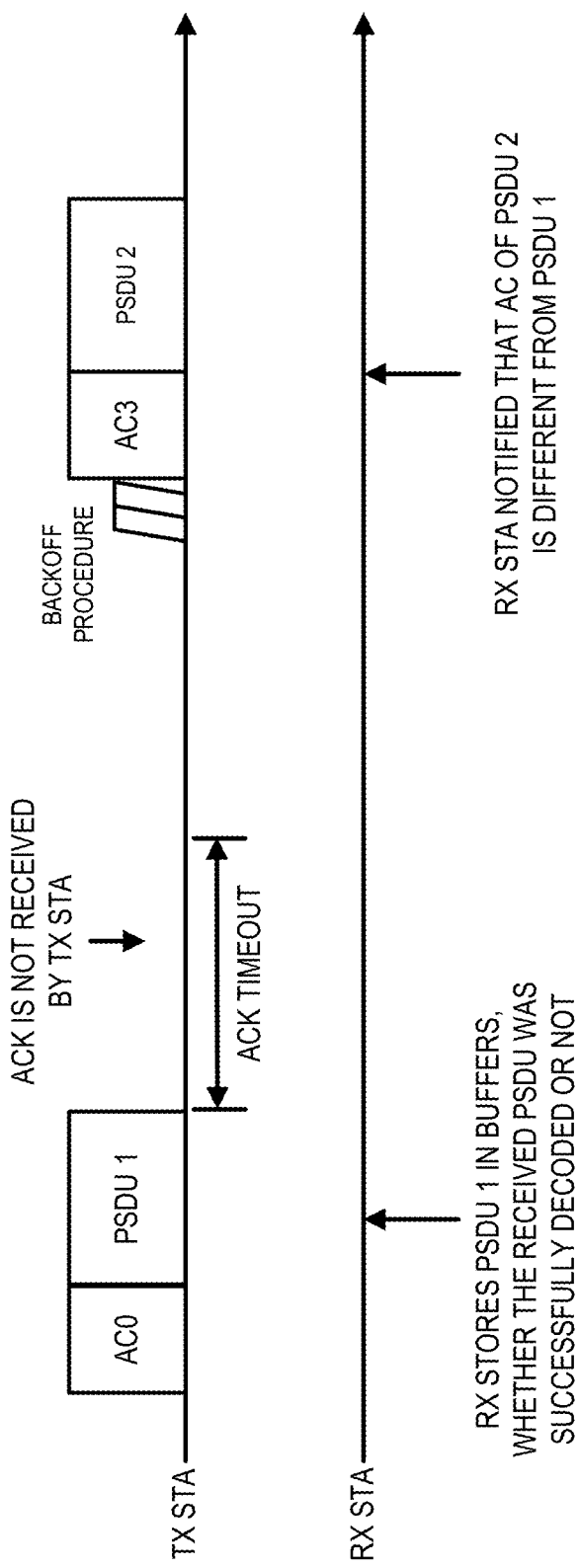
FIG. 23 shows access category identifying information included in a physical layer preamble of a PSDU, in accordance with some embodiments of the present disclosure.

To solve the above problem, AC information can be used for performing HARQ operations in a WLAN system. In particular, AC information (e.g., TID type) is included in an MPDU header of an MPDU. However, when HARQ is performed and a CRC check fails such that retransmission is necessary, the AC information inside the MPDU header cannot be guaranteed. Therefore, AC information of the corresponding packet/MPDU may be included in the PSDU preamble. Since each AC is transmitted as WLAN traffic, information regarding the number of bits in the PSDU (e.g., length/EHT_LENGTH) and the supported AC(s) may be added to the preamble of the PSDU or PPDU. As shown in FIG. 23, the AC information included in the PHY preamble can be used by the PHY layer to determine that the AC of PSDU 2 is different from the AC of PSDU 1, which was previous transmitted.

Figure 24:
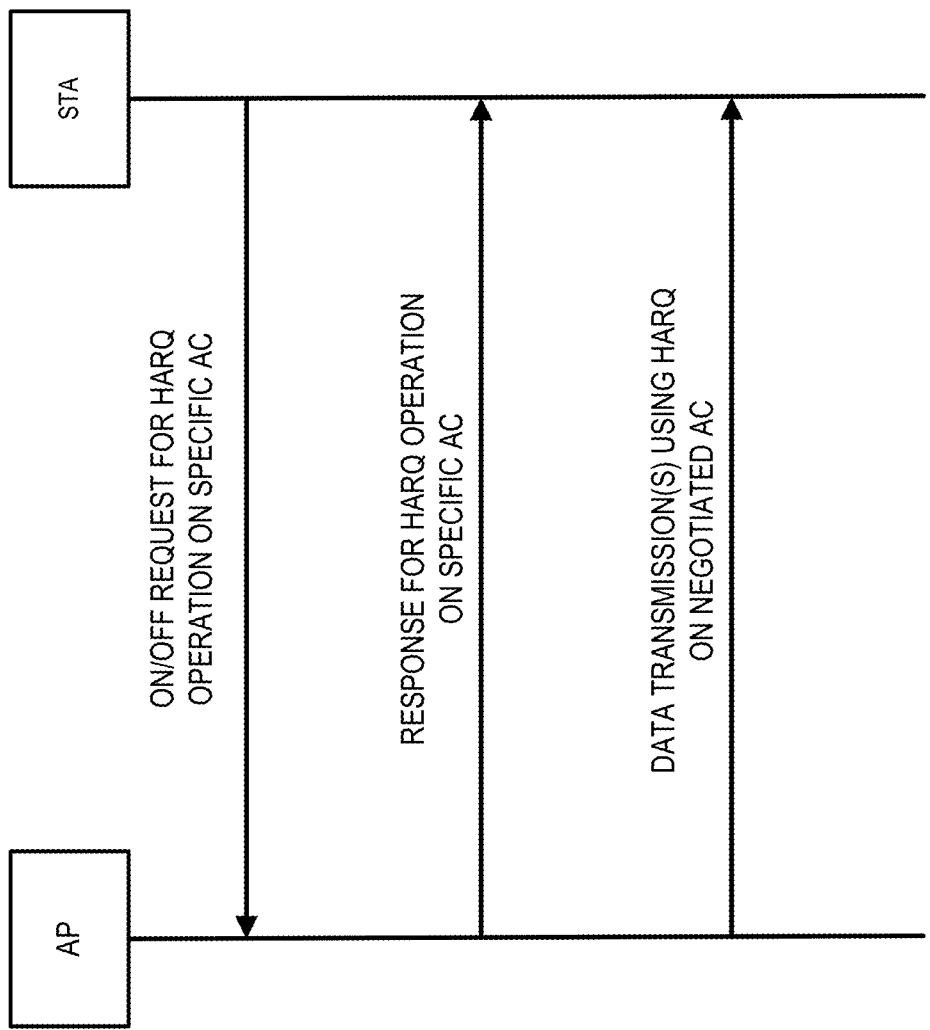
FIG. 24 shows the negotiation between an access point and a station regarding which access categories to perform HARQ operations, in accordance with some embodiments of the present disclosure.

It is possible to add a process identifier (ID) to a preamble of a PSDU regardless of inclusion of AC information. In some embodiments, the AC information for each AC in the PSDU may be included in a preamble of the PSDU (e.g., an EHT SIG field) instead of or in place of process ID information. However, in other embodiments, both the AC information for each AC in the PSDU and process ID information may be included in a preamble of the PSDU (e.g., an EHT SIG field). In addition, when AC information is included in the preamble, it becomes easy to determine whether to support a HARQ process for each AC. In particular, it is possible to determine specific ACs to perform HARQ, instead of all the transmitted ACs, through negotiation between an access point and station. As shown in FIG. 24, a station can transmit an on/off request to support or not support HARQ operations for particular ACs. In response to the on/off request, the access point can transmit a response to the station confirming or denying the request. Thereafter, the access point and the station can perform data transmissions using HARQ operations on negotiated ACs.

Figure 25:
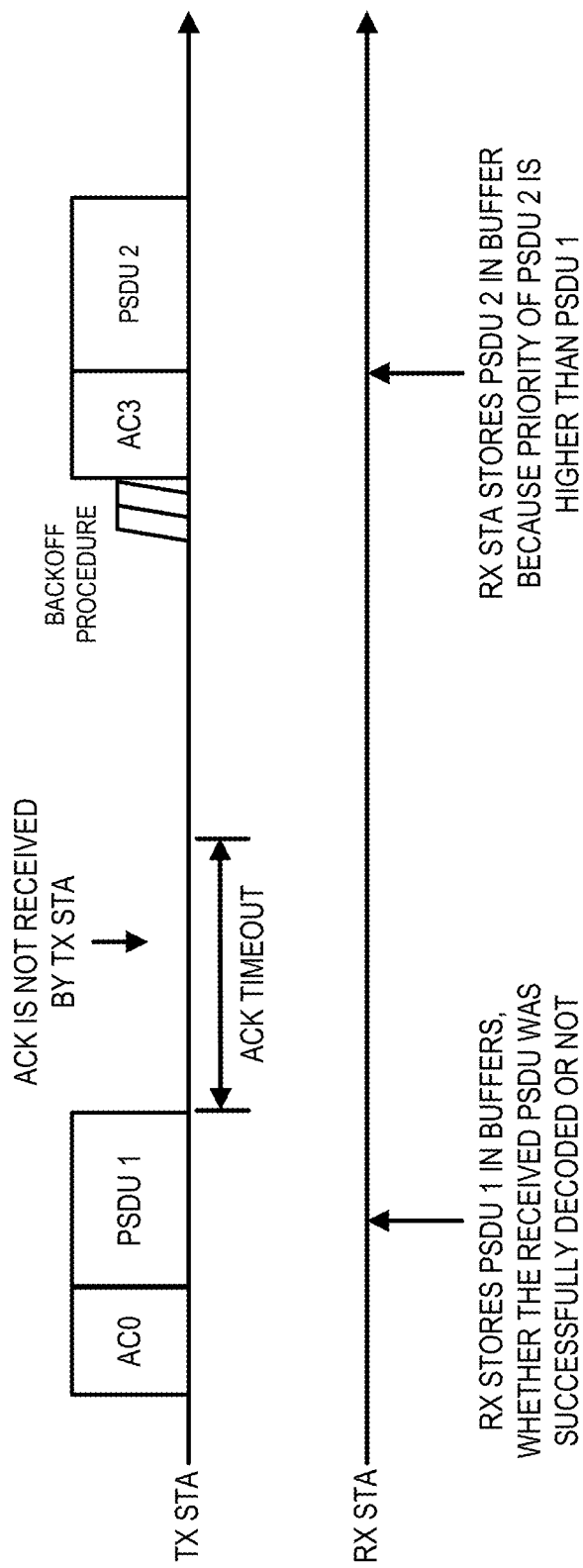
FIG. 25 shows HARQ operations involving access categories of different priority, in accordance with some embodiments of the present disclosure.

If the number of buffers available for HARQ operations at a receiving station is less than the number of ACs supported, the access point and station can negotiate to give priority to specific ACs. For example, as shown in FIG. 25, when a station receives a packet with an AC higher than that of packets currently stored in the buffer, the existing packets are discarded and the newly received packets can be stored in the buffer. In this case, when a PSDU corresponding to an AC with a low priority (e.g., AC0) is removed from the buffer, the station that removed the PSDU from their buffer can inform the transmitting station about the stop of the HARQ operation for the corresponding packet.

To perform HARQ operations, the transmitting station, which transmitted the packets that were not successfully received, must be correctly identified by the PHY layer of the receiving station. In some WLAN systems, the transmitting station is identified by checking the MAC address of the transmitter included in the MAC header of the MPDU after receiving the packet. At this time, if the CRC check of the MPDU fails, the correct transmitting station cannot be identified. However, in the case of cellular systems, the location of resources allocated to a station can be identified through a separate control channel. Thus, the transmitting station can be identified regardless of whether the CRC of the transport block is successful.

In IEEE 802.11ax-based systems, the preamble has information that can identify the transmitting station. Packets transmitted from overlapping BSSs (OBSSs) can be distinguished through 6-bit BSS color information. Uplink (UL) transmissions (i.e., transmission sent from STA to AP) and downlink (DL) transmissions (i.e., transmissions from AP to STA) can be distinguished with an UL/DL information bit.

Figure 26:
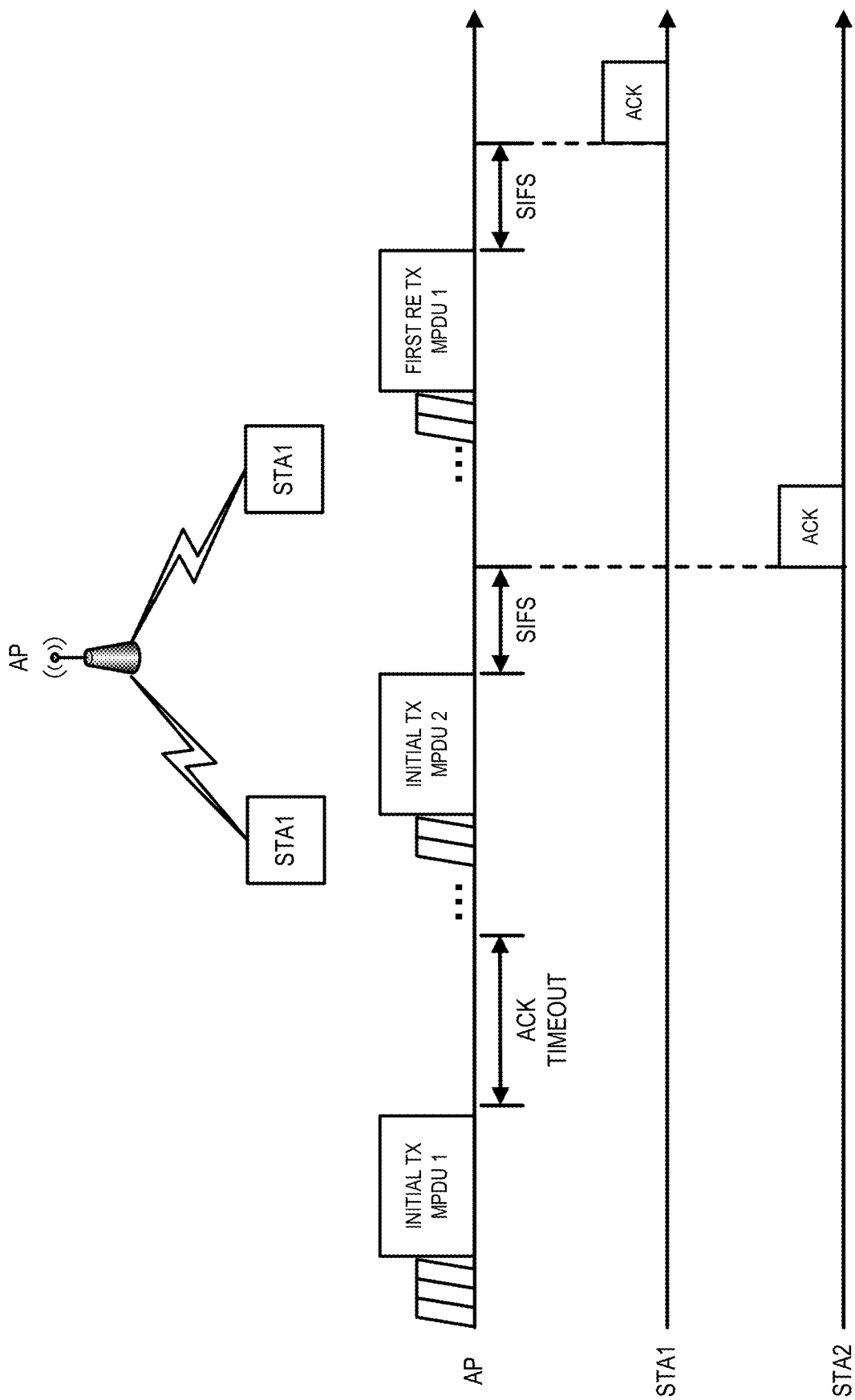
FIG. 26 shows transmission of a packet between an access point and a first station that is also detected by a second station, in accordance with some embodiments of the present disclosure.

However, in the systems described above, it is impossible to distinguish the correct transmission/reception station in the situation as shown in FIG. 26. In particular, when the AP transmits a packet to STA2, a third party STA1 receives it and the CRC check fails. Then, it is not possible to accurately distinguish whether the packet was transmitted to STA1 or STA2 just with the information of the preamble. If it is not distinguished, it cannot determine whether to store or discard the received frame in the buffer for HARQ.

To solve this problem, separate information can be inserted into a packet to distinguish the transmitting station. In one embodiment, the transmitting station information for identifying stations belonging to the same BSS includes a PARTIAL AID in the preamble of each frame.

Figure 27:
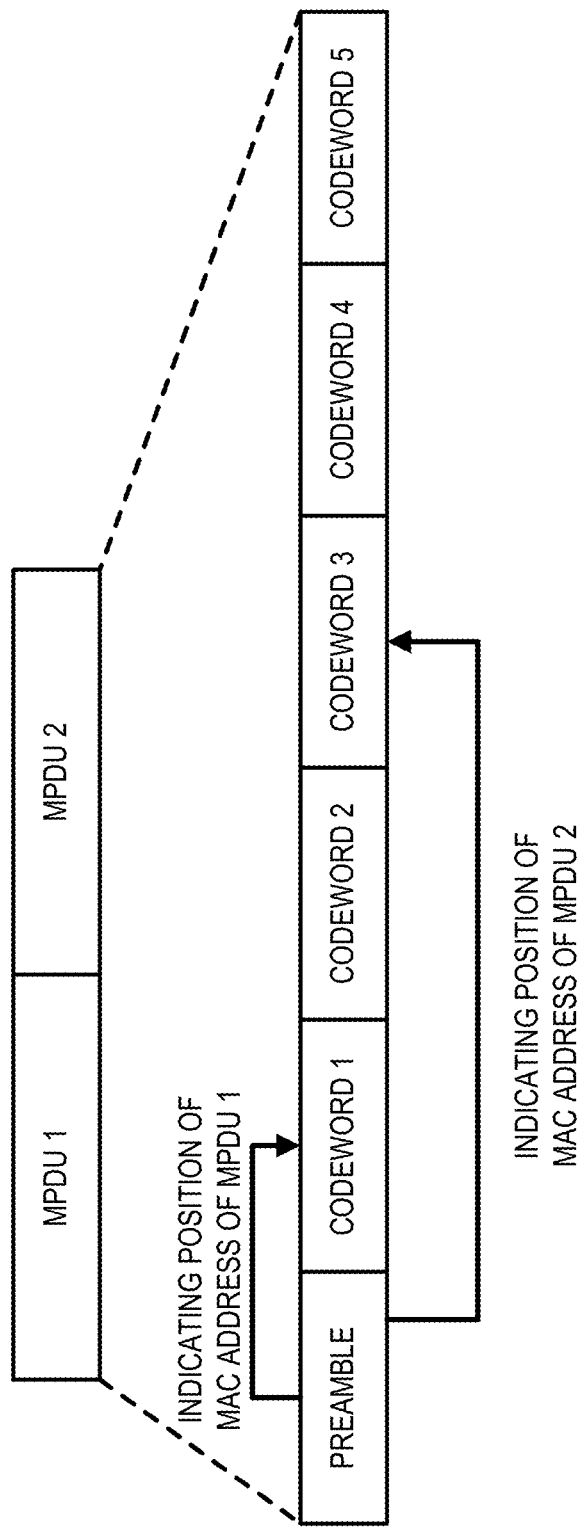
FIG. 27 shows a preamble of a PSDU that indicates the codeword location of a MAC address of a receiving station, in accordance with some embodiments of the present disclosure.

In another embodiment, the information, which is included in a preamble of the PSDU, includes an indication of the position of the codeword that includes the MAC address of the transmitting and receiving stations for each MPDU, as shown in FIG. 27. In some WLAN transmissions, the data is recognized as valid only when CRC verification of the entire MPDU is successful. However, in case of using a channel coding method (e.g., LDPC) with a separate CRC for each codeword, if only the validity of the codeword in which the MAC address is located can be confirmed, the transmitting station for HARQ can be identified. To this end, a field indicating the location of the codeword with the MAC address may be added to the PSDU.

If a number of MPDUs are included in one PSDU, a number of fields indicating the locations are needed as shown in FIG. 27. If only one MPDU is included in the PSDU, the same function can be performed without including information in the preamble, since the MAC address is included in the first codeword.

Figure 28:
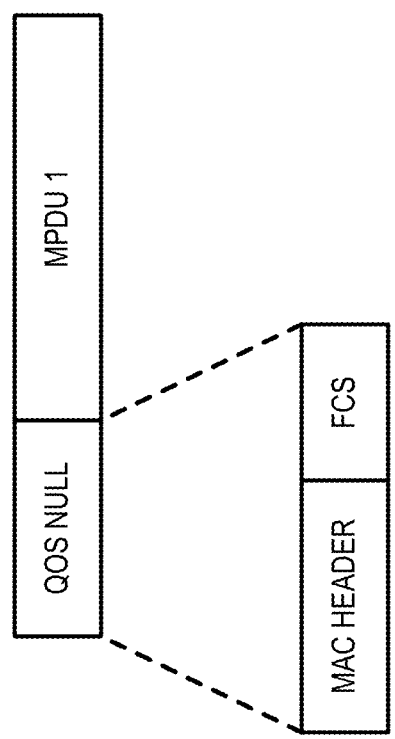
FIG. 28 shows a short MPDU that can be added to A-MPDU for indicating a receiving station address, in accordance with some embodiments of the present disclosure.

In addition to including information in the preamble, in some embodiments a short MPDU (e.g., a QoS null frame) can be added to an A-MPDU as shown in FIG. 28. Since the length of the added MPDU is shorter than that of MPDUs with user data, the probability of success with CRC is increased. Since the corresponding MPDU includes the same MAC address as the subsequent MPDU, the HARQ operation can be performed only if the CRC identification is successful on this first MPDU.

Figure 29:
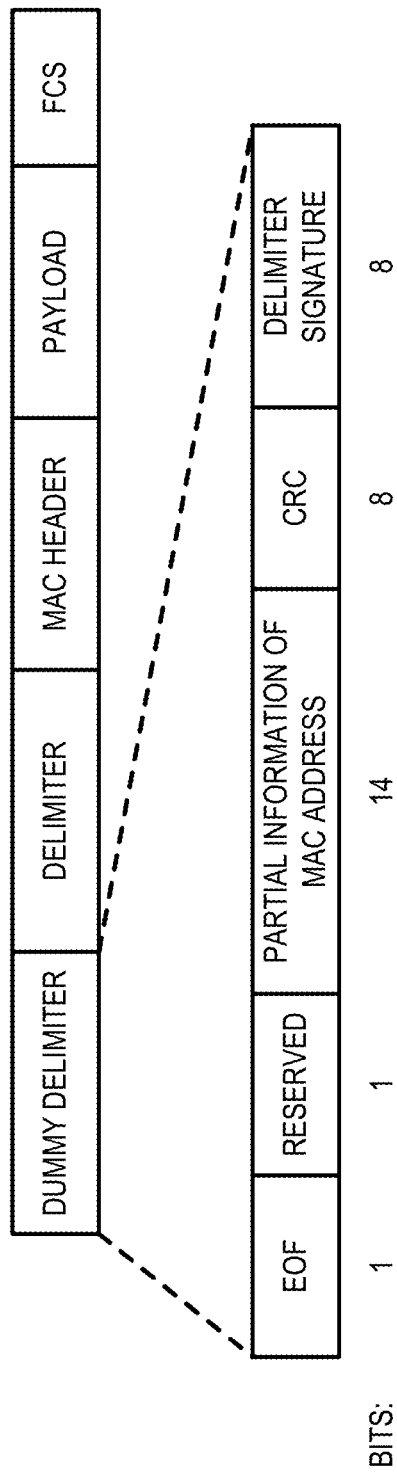
FIG. 29 shows a set of delimiters between MPDUs to indicate a receiving station address, in accordance with some embodiments of the present disclosure.
Figure 30:
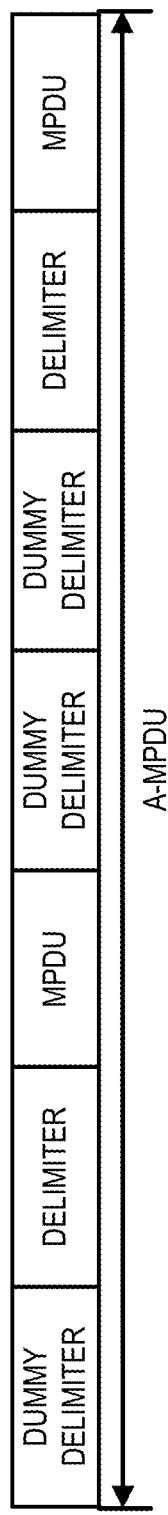
FIG. 30 shows a set of delimiters between MPDUs to indicate a receiving station address, in accordance with some embodiments of the present disclosure.

Since adding an additional MPDU to the PSDU may cause considerable overhead, in some embodiments, an alternative includes using a 4-byte delimiter between MPDUs. In some cases, a delimiter is located in front of a MPDU, when an A-MPDU includes length information of the MPDU and 8-bit CRC information. To identify the MAC address for HARQ operation, the delimiter structure can be modified to include some information of the MAC address of the transmitting and/or receiving station as shown in FIG. 29. The validity of the delimiter (sometimes referred to as a "dummy delimiter") can be confirmed by using the existing CRC field. In some embodiments, a dummy delimiter can be included in various locations in one PSDU, as shown in FIG. 30, to increase the probability of obtaining the address of the transmitting station for HARQ.

As discussed above, it is possible to (1) smoothly apply HARQ operations/processes that improve retransmission performance in a WLAN system, (2) efficiently manage buffers with respect to multiple ACs for use in HARQ operations/processes in consideration of the characteristics of a WLAN system, and (3) accurately identify the transmitting station and the receiving station in a WLAN transmission required for HARQ operations/processes.

As mentioned herein, for efficient use of a HARQ process, the HARQ operation must be completed successfully as soon as possible and without being interrupted or damaged by transmissions of third-party devices (i.e., stations that are not participating in the HARQ operation). To achieve this, the exclusive use of channel resources should be guaranteed for stations participating in the HARQ operation when a HARQ operation is being performed. In general, the monopolization of channel resources is possible by acquiring a transmit opportunity (TXOP) using an RTS/CTS sequence. However, RTS/CTS has a relatively long channel occupancy time because it uses a non-HT PPDU format. Therefore, if RTS/CTS is used with a HARQ operation, there is a possibility that a considerable surplus of resources is wasted, which will result in degraded performance of the entire network system. However, stations participating in HARQ operations should be able to prohibit channel access by all nearby stations (e.g., stations in range of the stations participating in the HARQ operation) during the HARQ sequence. In some cases, legacy stations may present in the network in addition to extended high-throughput (EHT) stations (e.g., stations supporting IEEE 802.11be). To provide backward compatibility, legacy stations also need to be included in techniques to avoid channel occupancy when a HARQ operation occurs.

A principle of WLAN standards (e.g., IEEE 802.11 standards) is to maintain backward compatibility with legacy devices. Accordingly, even if a WLAN standard is newly revised, it should be compatible with devices manufactured according to former/legacy WLAN standards to maintain a broad WLAN ecosystem. However, when a WLAN device manufactured under a previous version of the standard receives a packet based on a new version of the standard, the WLAN device cannot interpret all of the payload data of the packet. Instead, for backward compatibility, PPDU formats of all WLAN standards have common L-SIG fields located in the PHY preamble. For example, FIG. 31 shows the PHY preamble format for IEEE 8021.11a/g, 802.11n (mixed), 802.11ac, and 802.11ax (single user). As shown, (1) the IEEE 802.11a/g PPDU format includes an L-STF, L-LTF, L-SIG, and a data field; (2) the IEEE 802.11n PPDU format includes an L-STF, L-LTF, L-SIG, High-Throughput (HT) Signal 1 (HT-SIG1) field, an HT Signal 2 (HT-SIG2) field, an HT-STF, an HT-LTF, and a data field, (3) the IEEE 802.11ac PPDU format includes an L-STF, L-LTF, L-SIG, Very High-Throughput (VHT) Signal A1 (VHT-SIGA1) field, a VHT Signal A2 (VHT-SIGA2) field, a VHT-STF, a VHT-LTF, a VHT Signal B (VHT-SIGB) field, and a data field, and (4) the IEEE 802.11ax single user PPDU format includes an L-STF, L-LTF, L-SIG, Repeated L-SIG (RL-SIG), a High Efficiency (HE) Signal A1 (HE-SIGA1) field, an HE Signal A2 (HE-SIGA2) field, an HE-STF, an HE-LTF, and a data field. Through the interpretable legacy fields (e.g., L-STF, L-LTF, and L-SIG field), a legacy device can comprehend all meaningful information for interpreting the PPDU and determining channel access.

Figure 32:
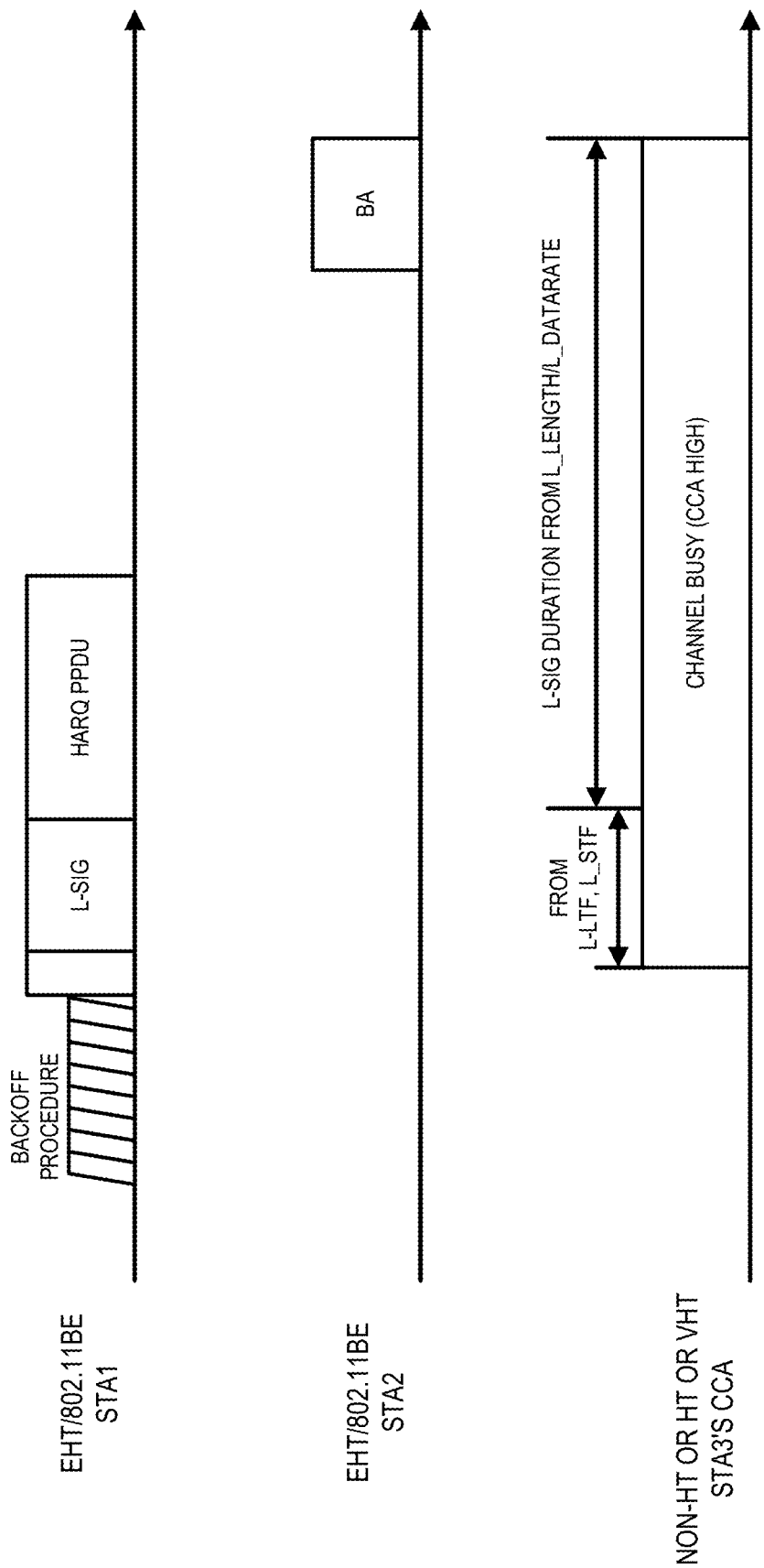
FIG. 32 shows a channel state for a legacy device based on transmissions between non-legacy devices, in accordance with some embodiments of the present disclosure.

In particular, the WLAN device recognizes the PPDU through the legacy short training field (L-STF) and the legacy long training field (L-LTF) of the packet/PPDU preamble. Thereafter, the WLAN device checks which standard the received PPDU is based on. If the received PPDU is configured under a later standard than the one implemented in the current WLAN device, the contents received after the L-SIG field cannot be correctly interpreted. Thus, reception of the corresponding PPDU is treated as an error during the reception (e.g., treated as FormatViolation or PLCP field out of spec among Error Types). When a receive error occurs, Non-HT, HT, VHT, and HE devices (i.e., 802.11a/g, 802.11n, 802.11ac, and 802.11ax, respectively) calculate the duration of the received PPDU using the L_LENGTH and L_DATARATE subfields of the PPDU's L-SIG field. If the received signal strength is greater than the clear channel assessment (CCA) threshold, the CCA is kept busy for the time calculated above, as shown in FIG. 32. For example, when EHT STA1 in FIG. 32 attempts to transmit, this WLAN device sets L_LENGTH and L_DATARATE subfields in the L-SIG field of the HARQ PPDU to the time until the end of a Block Acknowledgement (BA) transmission. In this situation, pre-802.11be devices (i.e., legacy devices in relation to IEEE 802.11be) that receive this EHT PPDU cannot access the channel because the CCA is busy (i.e., CCA High) during this time and the transmission attempt will be delayed. By adjusting L_LENGTH and L_DATARATE subfields of HARQ PPDUs, the HARQ sequence between IEEE 802.11be devices is not disturbed. However, L_LENGTH and L_DATARATE subfields of the HARQ-related PPDU should not be used by IEEE 802.11be devices designated as the receiver for purposes of calculating the actual number of PPDU symbols. Instead, when receiving the PPDU, the 802.11be device should be able to obtain the number of actual received PPDU symbols or PPDU RXTIME through the value provided in a EHT SIGNAL field (e.g., EHT-SIGA1 and/or EHT-SIGA2), which is shown in FIG. 33.

Figure 33:
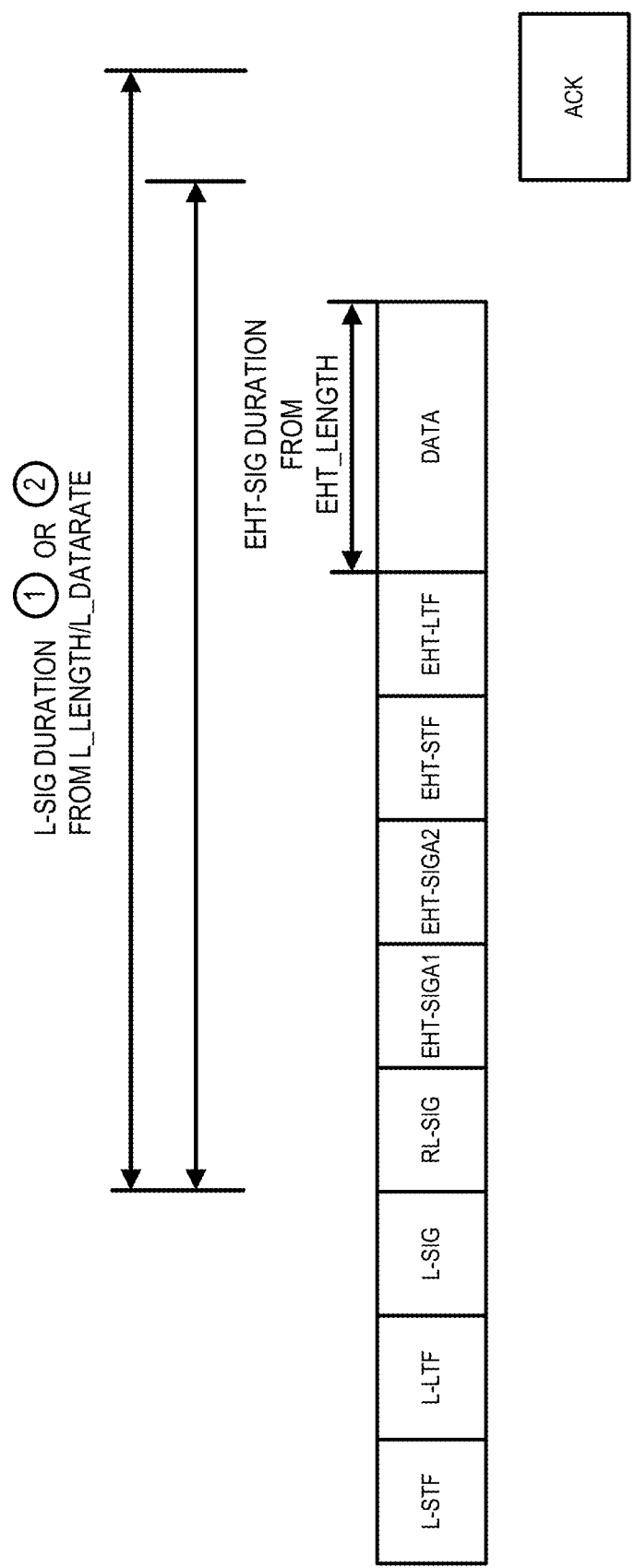
FIG. 33 shows timing information for a PPDU, in accordance with some embodiments of the present disclosure.

As shown in FIG. 33, the transmitting device includes in the EHT SIGNAL field of a PPDU an EHT_LENGTH subfield indicating the actual transmission PPDU duration. For the L_LENGTH and L_DATARATE subfields, the duration can be set as long as desired to make the CCA of legacy devices busy for this duration. For non-HARQ operations, the duration calculated using the L-SIG field may be set to match the end point of the transmission PPDU. In FIG. 33, options 1 and 2 indicate that the transmitting device can adjust the L-SIG duration as desired. By using this duration, the CCA busy state of receiving legacy devices can be maintained as long as a corresponding/desired time and can be used to protect HARQ transmissions.

Figure 34:
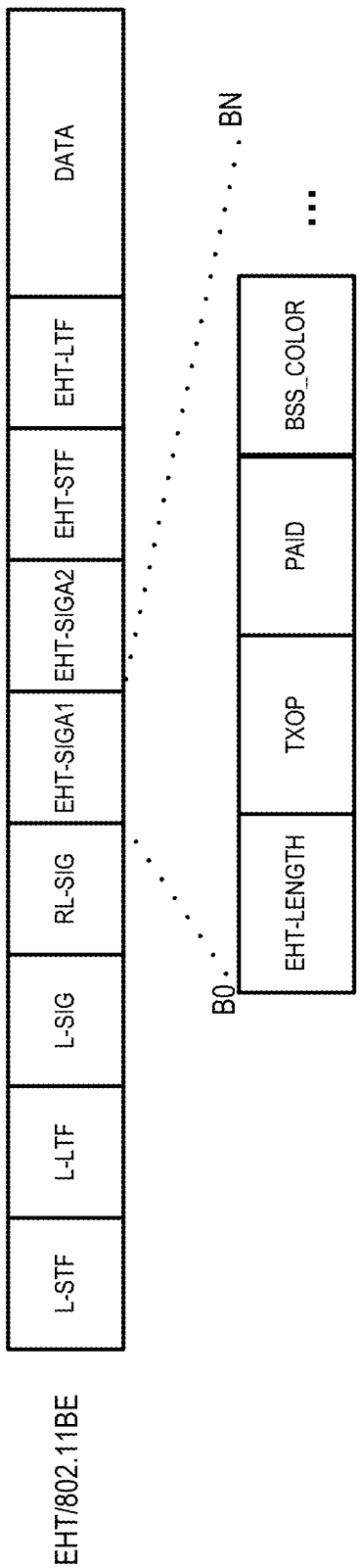
FIG. 34 shows a PPDU format, including the contents of a signaling field, in accordance with some embodiments of the present disclosure.

To protect a HARQ sequence, the intended receiver of the PPDU associated with the HARQ operation must be able to accurately identify whether the PPDU was transmitted to itself (i.e., the PPDU was addressed to the same address as the address of the transmitting station) at the PHY layer. In some embodiments, a HARQ-related PPDU may include codewords configured in an MPDU in its MAC payload. To check whether the transmitted PPDU was addressed to a receiving device, the receiving device can internally transfer the PPDU to the MAC layer to decode the receiver address of the MAC header. The MAC layer is needed because the PHY layer does not have enough information/identifiers to determine the receiver address of the PPDU and associated MPDUs. However, relying on the MAC layer to determine the receiver address is unreliable when the MAC CRC indicates damaged information of an MPDU. Further, the MPDU will likely fail an integrity check of a corresponding codeword at the PHY layer. In addition, checking the MAC payload has a disadvantage in that it takes longer to retrieve information/data from the MAC layer than to check for information/data at the PHY layer. Thus, there is insufficient basis for determining whether to use the relevant received PPDU for the HARQ operation. However, the HARQ-related PPDU may include only the codewords in the MAC payload. In other words, the MAC payload only contains a set of coded bits that do not include any meaningful information, such as information from the MAC header. At this time, the receiving device cannot grasp any meaningful information, such as the delimiter, for identifying the receiver from the MAC payload. In both cases described above, it is difficult to identify the intended receiver of the HARQ-related PPDU transmitted on the channel. Therefore, the HARQ-related PPDU (e.g., an EHT PPDU) must provide sufficient information for identifying the receiver to support the HARQ operation at the PHY layer. As shown in FIG. 34, a PPDU can provide Association Identifier (AID) information through the Partial AID (PAID) subfield as well as information for specifying whether the PPDU was transmitted in the same BSS through the BSS_COLOR subfield.

In addition, to other 11be EHT STAs, except the intended receiver, the transmitter provides the TXOP duration in the EHT SIGNAL field, with which the receiver can enter the power save mode immediately after decoding the preamble of the PPDU. Accordingly, this will minimize power consumption.

In IEEE 802.11ac, a receiving device could check whether it is the intended receiver of a received PPDU through the PAID subfield provided in the VHT SIG field. However, when there were many overlapping BSSs, the PAID could be overlapped/duplicated amongst surrounding devices. In IEEE 802.11ax, the receiving device could not check whether it was the intended receiver of the received PPDU for Downlink (DL) HE PPDUs. Instead, the receiving device could only determine whether the PPDU was an intra/inter BSS using BSS_COLOR bits in the PPDU. However, in some embodiments, both BSS color and device/STA identifier information (e.g., PAID) may be provided in the PHY preamble so that every EHT receiver of the PPDU can determine whether it is the appropriate receiver of the PPDU as soon as it detects the EHT PHY preamble. This means that a receiver does not need to wait until it processes a MAC header within a PPDU to identify a receiver address. Therefore, the PPDU can be composed of only codewords with no indication of the MAC header to still determine the receiver address. If the receiving device is not the intended receiver, the device can enter a power save mode for the time indicated in the TXOP subfield. As the device does not need to interpret the rest of the MAC payload, it can reduce power consumption.

In a WLAN system, there are no separate control channels, and no slots are allocated to each individual device as there are in cellular systems (e.g., LTE) that adopt a Time Division Duplex (TDD) scheme. Therefore, a WLAN device cannot know whether or not it is time to receive data and has no way to inform that the scheduled data has not been received, as a negative acknowledgment (NACK) frame used in HARQ systems can provide. Instead, the transmitter in a WLAN system can set the ACKTimeout (ACKTO) to recognize the reception of data from an intended receiving device just as the NACK frame of the HARQ used by LTE or 5G New Radio (NR). With ACKTimeout, the transmitter can assume whether a transmitted frame was successful or not. In one embodiment, the ACKTimeout is defined according to Equation 1 below.

$$\text{ACKTimeout} = a\text{SIFSTime} + a\text{SlotTime} + a\text{RxPHYStartDelay} \qquad \text{Equation 1}$$

If the ACKTO timer expires during a HARQ operation, the device transmitting the data can recognize that a NACK frame has been received. At the same time, the WLAN device that has attempted the transmission, immediately transmits the same PPDU as the previous one. In this case, the ACKTO value can be configured according to a legacy specification or can be configured under separate rules. When the ACKTO is defined according to a legacy specification that is at least larger than the value of an SIFS time along with two slots, there is a possibility that another WLAN device may break the HARQ sequence. This can be prevented by using the RTS/CTS or L-SIG duration described above.

Figure 35:
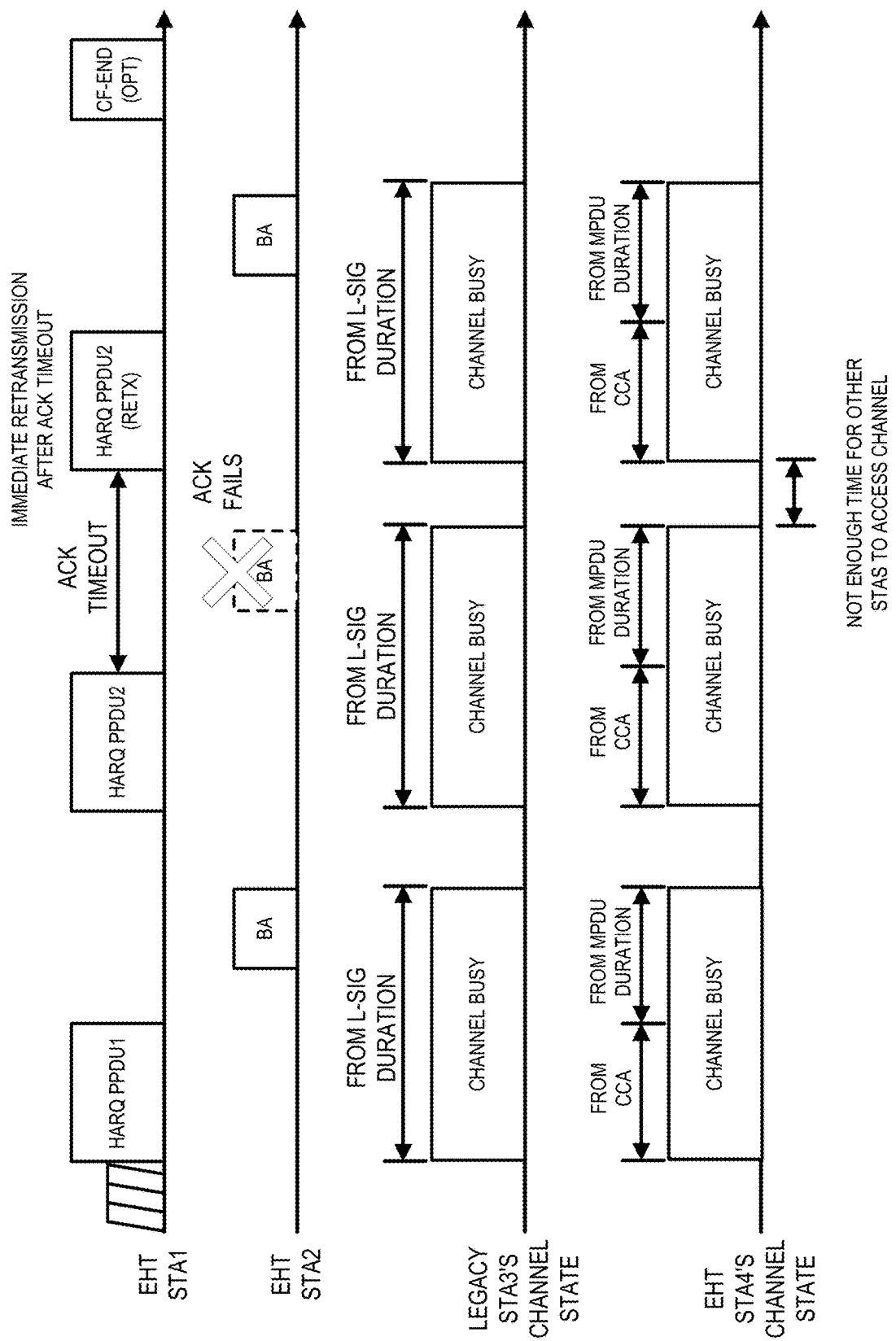
FIG. 35 shows a process of retransmitting a HARQ PPDU that was transmitted right before acknowledgement time out, in accordance with some embodiments of the present disclosure.

FIG. 35 shows a process of retransmitting a HARQ PPDU (i.e., HARQ PPDU2) that was transmitted right before an ACKTO occurred based on a HARQ operation proposed herein. FIG. 35 also shows the process of protecting the HARQ sequence using the L-SIG duration. In particular, STA1 transmits HARQ PPDU1 and HARQ PPDU2 to STA2, including a retransmission of HARQ PPDU2. Although STA3 and STA4 are stations that are not connected to or belonging to the overlapping BSS, these stations are in range of at least STA1 and receive HARQ PPDU1 and HARQ PPDU2. The EHT station STA4, which is not the intended receiver of the HARQ PPDUs transmitted by STA1, can comprehend the channel state by using the MAC duration in a MAC header that was successfully interpreted along with the CCA indication generated by the reception of the PHY preamble (e.g., based on L-SIG duration). Based on this, STA4 does not occupy the channel during the HARQ sequence established between STA1 and STA2. In some cases, STA4 may not try to occupy the shared channel because it has entered a power save mode via a TXOP field as described herein. Legacy devices, such as STA3, will configure the CCA through the duration information included in L-SIG field of the HARQ PPDUs and will recognize that the current channel is busy during that period. As shown in FIG. 35, after STA1 transmitted HARQ PPDU1, STA2 transmits a block ACK (BA) back to STA1 to indicate which codewords or HARQ units were successfully received and decode for HARQ PPDU1. Thereafter, STA1 collects information of only failed codewords and thereafter configures HARQ PPDU2 with these codewords and transmits HARQ PPDU2. However, no acknowledgement is received from STA2 within the ACKTimeout period. STA1 can recognize that the current sequence is protected from legacy and EHT STAB by using the L-SIG duration and the EHT_LENGTH described above. Accordingly, STA1 may attempt to retransmit the same PPDU (i.e., HARQ PPDU2) after the ACKTimeout period. Once completing the HARQ operation, STA1 may transmit a CF-END frame to make the channel available such that other devices can utilize it.

In some WLAN systems, when an ACKTO occurs in the transmitting device operating as the TXOP holder, the previously designated TXOP duration is interrupted, and the transmitting device loses channel occupancy authority. The ACKTO during HARQ operation may be caused by a packet collision or the sudden degradation of the channel. In such situations, it may be helpful, for the purpose of improving performance, to continue the HARQ sequence/operation once more instead of losing channel occupancy rights (i.e., losing TXOP holder/owner status), which may have been difficult to obtain. Nevertheless, the HARQ operation may be stopped if ACKTO occurs repeatedly (i.e., after a predetermined threshold has been reached).

In some embodiments, a HARQ PPDU supporting a HARQ operation can be composed of multiple codewords at the PHY layer. In the initial transmission of a HARQ PPDU, the intended receiving device of the PPDU may fail to interpret some codewords at the PHY layer. The receiving device will send a response packet to the sender with information about the codewords that failed to be successfully received/decoded. The transmitting device will respond with the failed codewords. At this time, the transmitting device should provide the information on which codeword it is retransmitting. Based on this information, the receiving device can combine the existing codewords stored in the soft combining buffer and the codewords received via retransmission. The information on which codeword the transmitting device is retransmitting may be included in a signal field of the EHT PPDU. This information can be used for all EHT PPDUs and not just for retransmission PPDUs.

In some embodiments, it is assumed that the retransmission of a HARQ PPDU is not composed in units of MPDUs but by collecting only failed codewords among those used in the initial transmission. Thus, most of the retransmission process is governed by the PHY layer and the MAC layer provides only minimal or no assistance. This codeword-based retransmission has a problem in that the longer the transmitted data length, the more the information about the codewords needs to be stored and transmitted. In addition, this information should be provided to the signal field in one of the PHY preambles and the number of available bits in the signal field is limited. To solve this problem, the codewords are grouped into predetermined sizes and the information about each group is composed based on a bitmap. Through this, the amount of information to be transmitted in the signal field can be minimized. The number of codewords contained in one group can be pre-coordinated between AP and STA when they are associated. Since the size of the codeword groups is related to the size of the buffer memory used for the HARQ operation of the device, it must be determined individually for each STA at the time of association.

Figure 36:
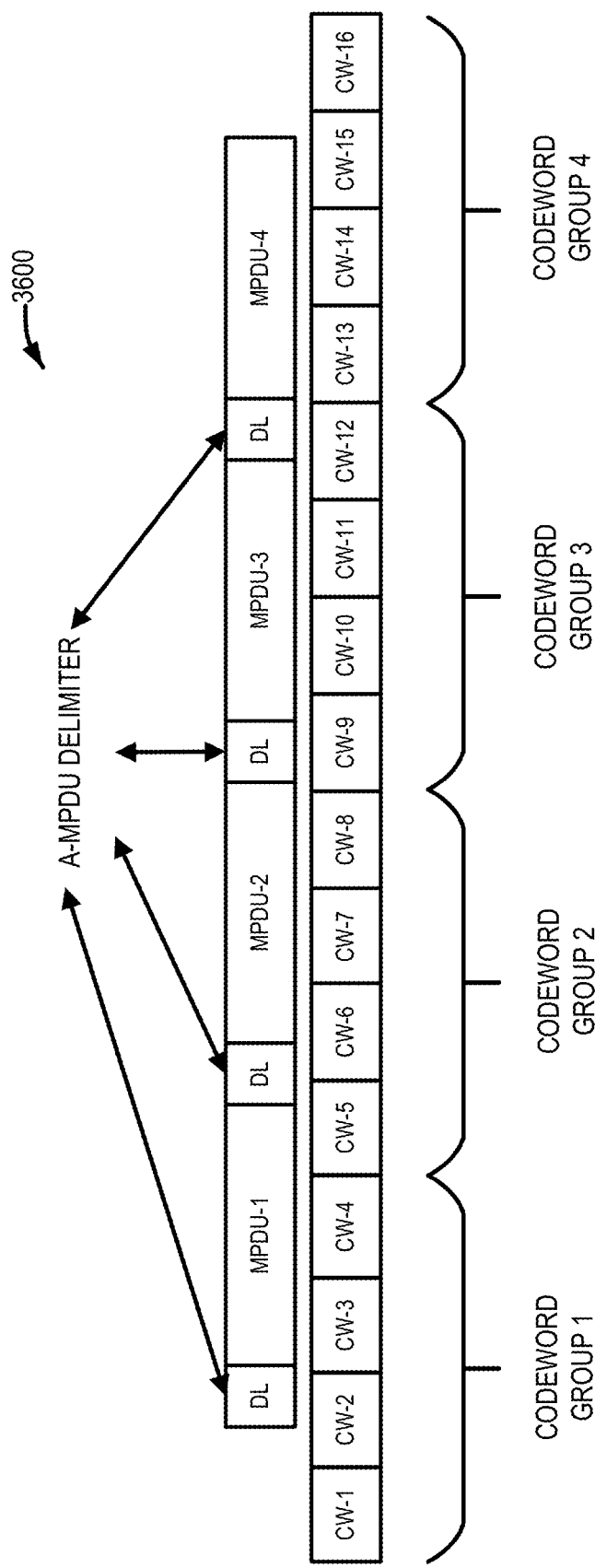
FIG. 36 shows an A-MPDU composed of several MPDUs, which are separated by delimiters, and the A-MPDU further composed of groups of codewords, in accordance with some embodiments of the present disclosure.

As shown in FIG. 36, the aggregated MPDU (A-MPDU) 3600 is configured at the MAC layer and can be coded as a set of codewords (e.g., CW-1 through CW-16) at the PHY layer and a certain number of codewords can be grouped into codeword groups. As shown in FIG. 36, four codewords are formed into one group and the whole PPDU is composed of four groups.

Figure 37:
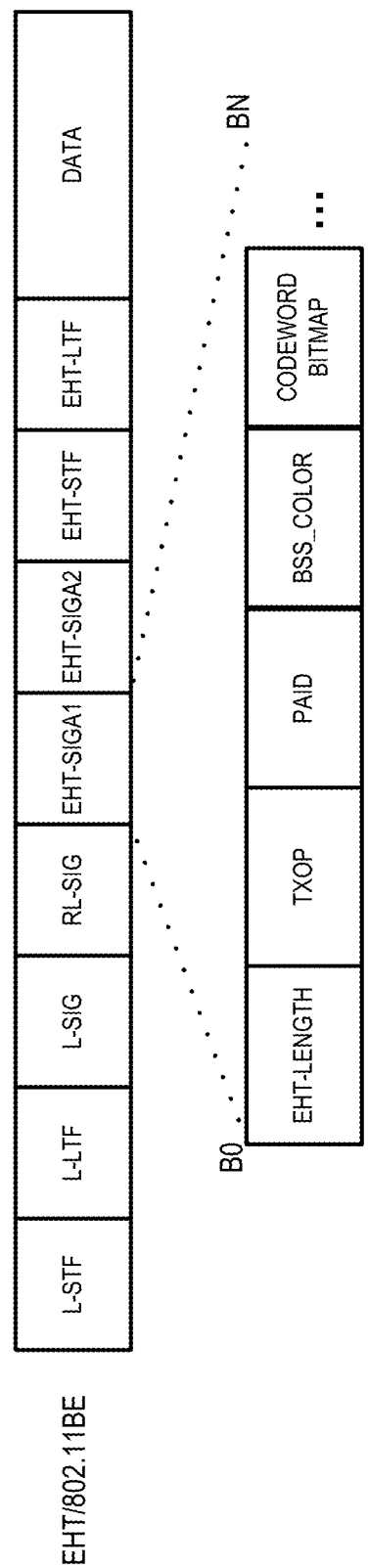
FIG. 37 shows a PPDU format, including the contents of a signaling field, in accordance with some embodiments of the present disclosure.

Bitmap information for each codeword group of a HARQ PPDU can be included in a subfield of the EHT-SIG field (i.e., a codeword bitmap field). The relevant bitmap contains the information of the codeword group in the PPDU transmission. In some embodiments, the codeword bitmap information for the transmitted codeword groups can be included in the ACK frame as its response may exist in the MAC payload. In some embodiments, the bitmap in the response packet includes information on the successfully received codeword groups. In some embodiments, a HARQ PPDU with codeword group bitmap information can be configured in the format shown in FIG. 37. Namely, the EHT-SIGA1 field can include several subfields, including an EHT-_LENGTH subfield, a TXOP subfield, a PAID subfield, a BSS_COLOR subfield, and a Codeword Bitmap subfield.

Figure 38:
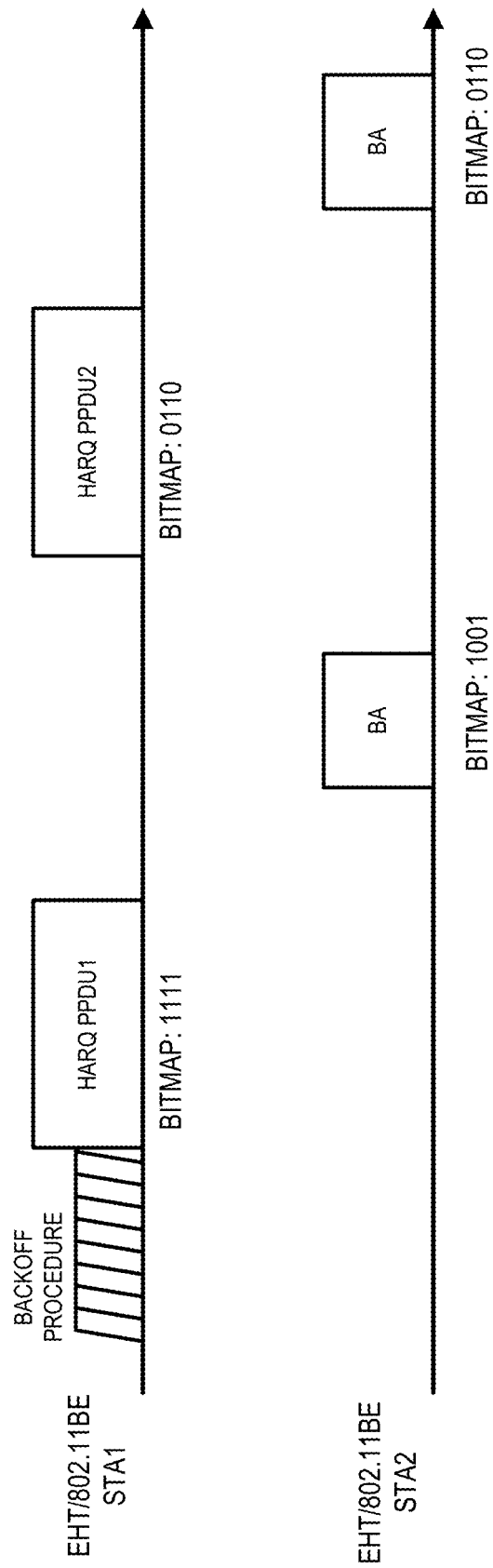
FIG. 38 shows codeword bitmaps that are used in each packet of a HARQ operation/sequence, in accordance with some embodiments of the present disclosure.

FIG. 38 shows codeword bitmaps that are used in each packet of a HARQ operation/sequence. As shown in FIG. 38, EHT STA1 transmits HARQ PPDU1 that contains 16 codewords (CW1-CW16) and the codewords are evenly grouped into four groups as shown in FIG. 36. Since the HARQ PPDU1 transmitted after the backoff procedure includes all four codeword groups, the bitmap is set as "1111" in the codeword bitmap subfield of an EHT SIG field. In the example shown in FIG. 38, the receiving device EHT STA2 did not properly receive/decode codewords CW8 and CW9 among all sixteen codewords. Accordingly, EHT STA2 responds by setting the codeword bitmap subfield to "1001", which means that codeword groups 1 and 4 have been correctly received but codeword groups 2 and 3 (i.e., the codeword groups containing codewords CW8 and CW9) were not correctly received/decoded and should be retransmitted.

Since EHT STA1 needs to retransmit the codeword groups 2 and 3, this device configures the HARQ PPDU2 containing the corresponding codeword groups and sets the codeword bitmap subfield to "0110" before the retransmission. EHT STA2 compares the codeword bitmap subfield that it sent in an ACK response (i.e., "1001") with the codeword bitmap subfield contained in the signal field of the received HARQ PPDU2. When EHT STA2 confirms that only the codeword groups requested for retransmission are included in HARQ PPDU2 (e.g., when a logical AND operation between the previous codeword bitmap from the acknowledgement and the current codeword bitmap from HARQ PPDU2 produces a result of zero (e.g., "0000")), soft combining is performed between the successfully received/decoded codewords from HARQ PPDU1 and HARQ PPDU2. If this condition is not satisfied, even if the HARQ-related PPDU has been addressed to EHT STA2, soft combining may not be performed. In addition, the EHT STA2 may request retransmission of the entire PPDU instead of the failed codewords when the error of the codewords in the received PPDU exceeds a predetermined threshold. Further, transmitting STA1 may recognize that the HARQ sequence has been successfully terminated when the codeword bitmap of the HARQ PPDU it transmitted and the codeword bitmap transmitted in response by the receiver STA2 are identical. When operating as shown in FIG. 38, the codewords CW5-CW7 and CW10-CW12 that were properly received with HARQ PPDU1 are also retransmitted, which consume more channel resources. However, gain may be generated in MRC operation of the receiving PHY layer, thereby improving receiver performance.

The embodiments presented herein propose methods and systems for protecting and maintaining HARQ sequences to obtain gains from HARQ in WLAN systems. The proposed techniques have several advantages, including protecting HARQ sequences/operations from interference of neighboring devices, including EHT devices and legacy devices, while supporting backwards compatibility. In addition, these techniques solve existing problems, including an inability of the receiving station to determine an intended receiver of a packet based on receiving/decoding a PHY layer of the packet. Further, the disclosure herein proposes techniques of reducing unnecessary information exchanged between devices in a HARQ sequence and improving receiver performance by grouping codewords of a HARQ PPDU.

Figure 39:
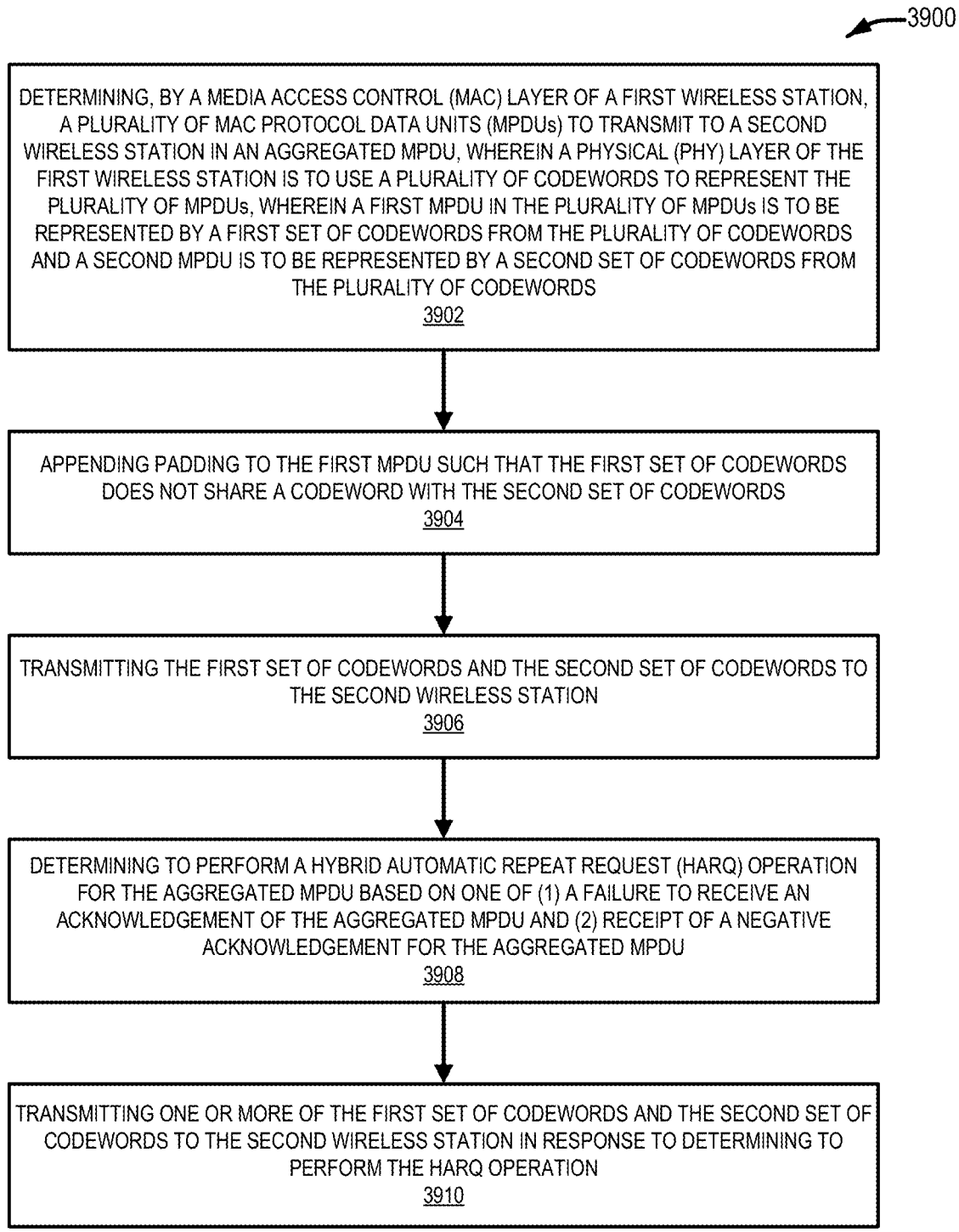
FIG. 39 shows a method for performing communications between a first wireless station and a second wireless station in a wireless network, in accordance with some embodiments of the present disclosure.

Turning now to FIG. 39, a method 3900 will be described for performing communications between a first wireless station and a second wireless station in a wireless network, in accordance with some embodiments of the present disclosure. Although shown in a particular order, in some embodiments, the operations of the method 3900 can be performed in a different order. For example, although shown as the operations being performed sequentially, in some embodiments, two or more of the operations of the method 3900 can be performed in partially or entirely overlapping time periods.

As shown in FIG. 39, the method 3900 can commence at operation 3902 with a Media Access Control (MAC) layer of the first wireless station determining a plurality of MAC Protocol Data Units (MPDUs) to transmit to the second wireless station in an aggregated MPDU. Further, a Physical (PHY) layer of the first wireless station is to use a plurality of codewords to represent the plurality of MPDUs. In particular, the MPDUs may be generated by the MAC layer and passed to the PHY layer of the first wireless station to be converted into the plurality of codewords for transmission to the second wireless station. For example, a first MPDU in the plurality of MPDUs is to be represented by a first set of codewords from the plurality of codewords and a second MPDU, which is adjacent to the first MPDU in the aggregated MPDU, is to be represented by a second set of codewords from the plurality of codewords. In this configuration, the plurality of codewords represent all the MPDUs in the aggregated MPDU, including the first and second codewords. Further, when not properly adjusted, a single codeword can span multiple MPDUs. Namely, a single codeword can represent the last one or more bits of a MPDU and the first one or more bits of the next MPDU.

At operation 3904, the first wireless station appends padding to the first MPDU such that the first set of codewords does not share a codeword with the second set of codewords. Namely, the padding ensures that a single codeword does not represent some part of the first MPDU and some part of the second MPDU. In one embodiment, the padding is information copied from a portion of one or more of the first MPDU and the second MPDU. For example, the padding includes a transmitting device address (e.g., an address of the first wireless station) of the first MPDU or a receiving device address (e.g., an address of the second wireless station) of the first MPDU. In some embodiments, the padding is equal to one or more bits from the front of the first MPDU. In some embodiments, the padding includes Cyclic Redundancy Check (CRC) information for the first MPDU. In some embodiments, a preamble of the aggregated MPDU includes one or more of (1) an indication of a location of a first transmitting device address in the first set of codewords, which was present in the first MPDU, and (2) an indication of a location of a second transmitting device address in the second set of codewords, which was present in the second MPDU. In some embodiments, the plurality of MPDUs includes a short MPDU (e.g., a quality of service null frame) that indicates a transmitting device address for the first MPDU.

At operation 3906, the first wireless station transmits the first set of codewords and the second set of codewords to the second wireless station. Namely, the first wireless station transmits a wireless signal to the second wireless station including or otherwise based on the first and second set of codewords.

At operation 3908, the first wireless station determines to perform a Hybrid Automatic Repeat Request (HARQ) operation for the aggregated MPDU based on one of (1) a failure to receive an acknowledgement of the aggregated MPDU and (2) receipt of a negative acknowledgement for the aggregated MPDU. In particular, the first wireless station can determine to perform a HARQ operation based on one or more of the embodiments discussed herein. In particular, the first wireless station can determine that one or more HARQ units (e.g., MPDUs and/or codewords) were not received successfully by the receiving and prepare those HARQ units for retransmission.

In some embodiments, the first wireless station determines to perform the HARQ operation in response to receiving an acknowledgement message from the second wireless station that includes a bitmap. In these embodiments, the bitmap includes a series of bits and each bit in the series of bits corresponds to whether a group of MPDUs in the plurality of MPDUs was successfully received and decoded by the second wireless station. In some embodiments, the determining to perform the HARQ operation is based on determining that one or more access categories of data in the aggregated MPDU are indicated to use the HARQ operation.

At operation 3910, the first wireless station transmits one or more of the first set of codewords and the second set of codewords to the second wireless station in response to determining to perform the HARQ operation. In particular, the first wireless station determines which elements of the aggregated MPDU were not successfully received by the second wireless station and retransmits those elements.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a first wireless station operating in a wireless network, the method comprising:
   determining, by a Media Access Control (MAC) layer of the first wireless station, a plurality of MAC Protocol Data Units (MPDUs) to transmit to a second wireless station in an aggregated MPDU, wherein a Physical (PHY) layer of the first wireless station is to use a plurality of codewords to represent the plurality of MPDUs, wherein a first MPDU in the plurality of MPDUs is to be represented by a first set of codewords from the plurality of codewords and a second MPDU is to be represented by a second set of codewords from the plurality of codewords;
appending padding to the first MPDU such that the first set of codewords does not share a codeword with the second set of codewords, wherein the padding is information copied from a portion of one or more of the first MPDU and the second MPDU; and
transmitting the first set of codewords and the second set of codewords to the second wireless station.

2. The method of claim 1, wherein the padding includes a transmitting device address of the first MPDU or a receiving device address of the first MPDU.

3. The method of claim 1, wherein the padding is equal to one or more bits from the front of the first MPDU.

4. The method of claim 1, wherein the padding includes Cyclic Redundancy Check (CRC) information for the first MPDU.

5. The method of claim 1, wherein a preamble of the aggregated MPDU includes one or more of (1) an indication of a location of a first transmitting device address in the first set of codewords, which was present in the first MPDU, and (2) an indication of a location of a second transmitting device address in the second set of codewords, which was present in the second MPDU.

6. The method of claim 1, wherein the plurality of MPDUs includes a quality of service null frame that indicates a transmitting device address for the first MPDU.

7. The method of claim 1, further comprising:
determining to perform a Hybrid Automatic Repeat Request (HARQ) operation for the aggregated MPDU based on one of (1) a failure to receive an acknowledgement of the aggregated MPDU and (2) receipt of a negative acknowledgement for the aggregated MPDU; and
transmitting one or more of the first set of codewords and the second set of codewords to the second wireless station in response to determining to perform the HARQ operation.

8. The method of claim 7, wherein the first wireless station determines to perform the HARQ operation in response to receiving an acknowledgement message from the second wireless station that includes a bitmap, and
wherein the bitmap includes a series of bits and each bit in the series of bits corresponds to whether a group of MPDUs in the plurality of MPDUs was successfully received and decoded by the second wireless station.

9. The method of claim 7, wherein the determining to perform the HARQ operation is based on determining that one or more access categories of data in the aggregated MPDU are indicated to use the HARQ operation.

10. A first wireless device operating in a wireless network, the first wireless device comprising:
a memory device storing a set of instructions; and
a processor coupled to the memory device, wherein the set of instructions when executed by the processor cause the first wireless device to:
determine, by a Media Access Control (MAC) layer of the first wireless device, a plurality of MAC Protocol Data Units (MPDUs) to transmit to a second wireless device in an aggregated MPDU, wherein a Physical (PHY) layer of the first wireless device is to use a plurality of codewords to represent the plurality of MPDUs, wherein a first MPDU in the plurality of MPDUs is to be represented by a first set of codewords from the plurality of codewords and a second MPDU is to be represented by a second set of codewords from the plurality of codewords;
append padding to the first MPDU such that the first set of codewords does not share a codeword with the second set of codewords, wherein the padding is information copied from a portion of one or more of the first MPDU and the second MPDU; and
transmit the first set of codewords and the second set of codewords to the second wireless device.

11. The first wireless device of claim 10, wherein the padding includes a transmitting device address of the first MPDU or a receiving device address of the first MPDU.

12. The first wireless device of claim 10, wherein the padding is equal to one or more bits from the front of the first MPDU.

13. The first wireless device of claim 10, wherein the padding includes Cyclic Redundancy Check (CRC) information for the first MPDU.

14. The first wireless device of claim 10, wherein a preamble of the aggregated MPDU includes one or more of (1) an indication of a location of a first transmitting device address in the first set of codewords, which was present in the first MPDU, and (2) an indication of a location of a second transmitting device address in the second set of codewords, which was present in the second MPDU.

15. The first wireless device of claim 10, wherein the plurality of MPDUs includes a quality of service null frame that indicates a transmitting device address for the first MPDU.

16. The first wireless device of claim 10, wherein the set of instructions when executed by the processor further cause the first wireless device to:
determine to perform a Hybrid Automatic Repeat Request (HARQ) operation for the aggregated MPDU based on one of (1) a failure to receive an acknowledgement of the aggregated MPDU and (2) receipt of a negative acknowledgement for the aggregated MPDU; and
transmit one or more of the first set of codewords and the second set of codewords to the second wireless device in response to determining to perform the HARQ operation.

17. The first wireless device of claim 16, wherein the first wireless device determines to perform the HARQ operation in response to receiving an acknowledgement message from the second wireless device that includes a bitmap, and
wherein the bitmap includes a series of bits and each bit in the series of bits corresponds to whether a group of MPDUs in the plurality of MPDUs was successfully received and decoded by the second wireless device.

18. The first wireless device of claim 16, wherein the determining to perform the HARQ operation is based on determining that one or more access categories of data in the aggregated MPDU are indicated to use the HARQ operation.

* * * * *